(12) United States Patent
Cho

(10) Patent No.: US 7,142,239 B2
(45) Date of Patent: Nov. 28, 2006

(54) APPARATUS AND METHOD FOR PROCESSING OUTPUT FROM IMAGE SENSOR

(75) Inventor: Soon-jae Cho, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 702 days.

(21) Appl. No.: 10/222,364

(22) Filed: Aug. 16, 2002

(65) Prior Publication Data
US 2003/0081465 A1 May 1, 2003

(30) Foreign Application Priority Data
Sep. 13, 2001 (KR) ................. 2001-56442

(51) Int. Cl.
H04N 3/14 (2006.01)
H04N 5/235 (2006.01)
H04N 5/208 (2006.01)
H04N 1/46 (2006.01)
G06K 9/40 (2006.01)
G06K 9/32 (2006.01)

(52) U.S. Cl. .................. 348/273; 348/222.1; 348/252; 382/266; 382/300; 358/525

(58) Field of Classification Search ............ None
See application file for complete search history.

(56) References Cited

U.S. PATENT DOCUMENTS

| | | | |
|---|---|---|---|
| 5,347,599 A * | 9/1994 | Yamashita et al. ........... | 382/278 |
| 5,512,945 A * | 4/1996 | Sakurai et al. ............ | 348/221.1 |
| 5,629,734 A * | 5/1997 | Hamilton et al. ......... | 348/222.1 |
| 5,652,621 A * | 7/1997 | Adams et al. ............... | 348/272 |
| 5,852,468 A * | 12/1998 | Okada ......................... | 348/280 |
| 6,229,578 B1 * | 5/2001 | Acharya et al. ............ | 348/607 |
| 6,295,087 B1 * | 9/2001 | Nohda ......................... | 348/273 |

(Continued)

FOREIGN PATENT DOCUMENTS

EP 0732859 A2 9/1996

(Continued)

*Primary Examiner*—David Ometz
*Assistant Examiner*—Nhan T. Tran
(74) *Attorney, Agent, or Firm*—Mills & Onello LLP

(57) ABSTRACT

An apparatus and method for processing the output data of an image sensor are provided. According to the apparatus and method, high quality pictures can be obtained regardless of whether the difference between intensities of different colors sensed in an arbitrary pixel of the image sensor is regular or irregular. Also, all edges of an image, including horizontal edges, vertical edges, diagonal edges, corner edges, and thick or thin edges, can be adaptively processed. The apparatus for processing the output data of an image sensor, the apparatus operating according to the method for processing the output data of an image sensor, has a line memory module, a delay mode, a directional coefficient value selector, and an adaptive interpolator. The method for processing the output data of an image sensor includes storing the output data of the image sensor, selecting a plurality of directional coefficient values using the stored output data of the image sensor and the output of the image sensor which is currently input, and an interpolation step for calculating data on a color signal desired to be obtained, using the plurality of direction coefficients selected and the output data of the image sensor. The plurality of directional coefficients are a first directional coefficient for indicating which component the edge of the pixel has from among the horizontal component, the vertical component, and the diagonal component, a second directional coefficient for indicating the degree of the horizontal edge component and a third directional coefficient for indicating the degree of the vertical edge component.

56 Claims, 14 Drawing Sheets

U.S. PATENT DOCUMENTS

| | | | |
|---|---|---|---|
| 6,339,479 B1* | 1/2002 | Kishimoto | 382/300 |
| 6,493,029 B1* | 12/2002 | Denyer et al. | 348/237 |
| 6,563,537 B1* | 5/2003 | Kawamura et al. | 348/222.1 |
| 6,570,616 B1 | 5/2003 | Chen | 348/272 |
| 6,714,242 B1* | 3/2004 | Kobayashi | 348/272 |
| 6,771,835 B1* | 8/2004 | Han et al. | 382/300 |
| 6,788,825 B1 | 9/2004 | Fujino | 382/266 |
| 6,836,289 B1* | 12/2004 | Koshiba et al. | 348/273 |
| 6,882,365 B1* | 4/2005 | Aoki | 348/273 |

FOREIGN PATENT DOCUMENTS

| | | |
|---|---|---|
| EP | 1111904 A2 | 6/2001 |
| JP | 11-122626 | 4/1999 |
| JP | 2001-28691 | 1/2001 |
| WO | 00/13406 | 3/2000 |

* cited by examiner

FIG. 14
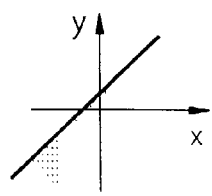 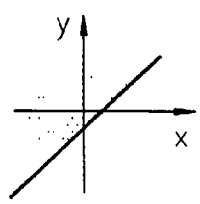 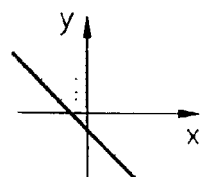 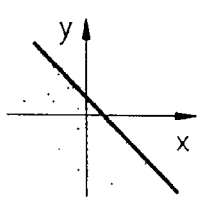
(a)    (b)    (c)    (d)
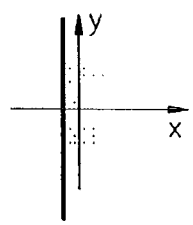 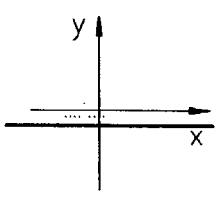 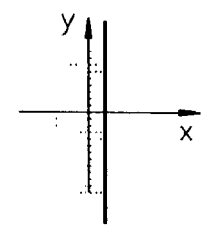 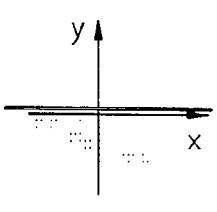 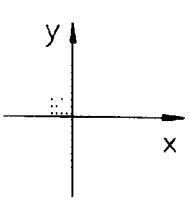
(e)    (f)    (g)    (h)    (i)
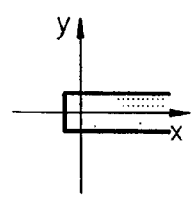 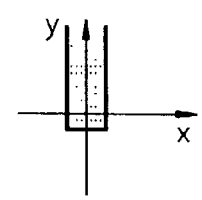 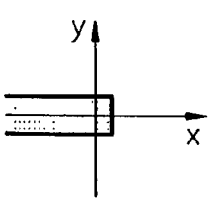 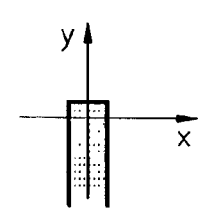 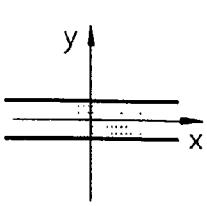
(j)    (k)    (l)    (m)    (n)
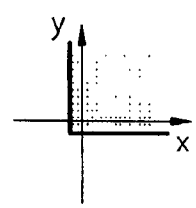 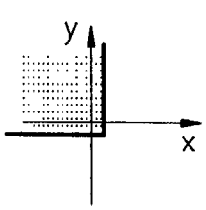 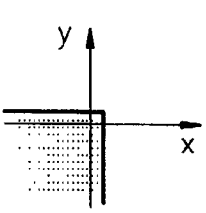 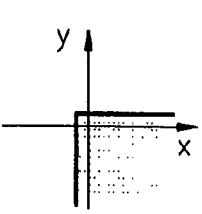 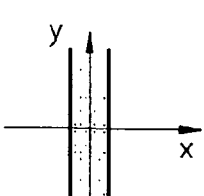
(o)    (p)    (q)    (r)    (s)

FIG. 15

| $\alpha_d$ | $\alpha_h$ | $\alpha_v$ | $G_{22}$ | EDGE TYPE |
|---|---|---|---|---|
| 0 | | 0 | $G_{32} + \dfrac{R_{22} - R_{42}}{2}$ | m, q, r |
| | | 1/2 | $\dfrac{G_{22} + G_{32}}{2} + \dfrac{2R_{32} - R_{02} - R_{42}}{4}$ | s |
| | | 1 | $G_{12} + \dfrac{R_{22} - R_{02}}{2}$ | k, o, p |
| 1/2 | 0 | 0 | $\dfrac{G_{23} + G_{32}}{2} + \dfrac{2R_{22} - R_{24} - R_{42}}{4}$ | a |
| | 0 | 1/2 | $\dfrac{2G_{23} - G_{12} - G_{32}}{4} + \dfrac{4R_{22} - 2R_{24} - R_{02} - R_{42}}{8}$ | e |
| | 0 | 1 | $\dfrac{G_{23} + G_{12}}{2} + \dfrac{2R_{22} - R_{24} - R_{02}}{4}$ | c |
| | 1/2 | 0 | $\dfrac{2G_{32} - G_{21} - G_{23}}{4} + \dfrac{4R_{22} - 2R_{24} - R_{20} - R_{24}}{8}$ | h |
| | 1/2 | 1/2 | $\dfrac{G_{21} - G_{23} - G_{12} - G_{32}}{8} + \dfrac{4R_{22} - R_{20} - R_{24} - R_{02} - R_{42}}{8}$ | i |
| | 1/2 | 1 | $\dfrac{2G_{12} - G_{21} - G_{23}}{4} + \dfrac{4R_{22} - 2R_{02} - R_{20} - R_{24}}{8}$ | f |
| | 1 | 0 | $\dfrac{G_{21} + G_{32}}{2} + \dfrac{2R_{22} - R_{20} - R_{42}}{4}$ | d |
| | 1 | 1/2 | $\dfrac{2G_{21} - G_{12} - G_{32}}{4} + \dfrac{4R_{22} - 2R_{20} - R_{02} - R_{42}}{8}$ | g |
| | 1 | 1 | $\dfrac{G_{21} + G_{12}}{2} + \dfrac{2R_{22} - R_{20} - R_{02}}{4}$ | b |
| 1 | 0 | | $G_{23} + \dfrac{R_{22} - R_{24}}{2}$ | j, o, r |
| | 1/2 | | $\dfrac{G_{21} + G_{23}}{2} + \dfrac{2R_{22} - R_{20} - R_{24}}{4}$ | n |
| | 1 | | $G_{21} + \dfrac{R_{22} - R_{20}}{2}$ | l, p, q |

FIG. 16

| $\alpha_h$ | $R_{23}$ | EDGE TYPE |
|---|---|---|
| 0 | $R_{24} + \dfrac{G_{23} - G_{25}}{2}$ | j, o, r |
| 1/2 | $\dfrac{R_{22} + R_{24}}{2} + \dfrac{2R_{23} - G_{21} - G_{25}}{4}$ | n |
| 1 | $R_{22} + \dfrac{G_{23} - G_{21}}{2}$ | l, p, q |

APPARATUS AND METHOD FOR PROCESSING OUTPUT FROM IMAGE SENSOR

BACKGROUND OF THE INVENTION

1. Field of the Invention

The present invention relates to an electronic camera, and more particularly, to a method for processing digital data output from an image sensor of a single sensor color electronic camera, using a plurality of directional coefficients.

2. Description of the Related Art

An image sensor for converting an input scene into an electronic signal senses the intensity of light which changes with respect to each divided region on the sensor, that is, the regular pattern of pixels. A color filter array (CFA) is installed on the sensor, and each pixel of the sensor senses the intensities of color signals which pass through the CFA.

In converting a color signal into an electronic signal, it is preferable that image data sensed in three color planes, which sense red, green, and blue, respectively, is all captured at the same time. This is because image data sensed in the three color planes must be appropriately mixed to obtain a high quality color picture.

If only one plane capable of sensing the three colors is used instead of the three color planes, the plane is referred to as a single sensor. In general, a single sensor CFA has the structure of a normal pattern of a color filter so that each pixel senses one color. A single sensor Charge Coupled Device (CCD) or a CMOS image sensor is a device for sensing a scene which is input to a camera, and outputs digital data having information on the intensity of a color which is sensed by each pixel. A video data item output from the single sensor CCD or CMOS image sensor has information on only one color signal out of Red (R), Green (G), and Blue (B). Therefore, a data item of the single sensor image sensor should generate information on the remaining two colors by using an interpolation method.

A data structure in which a color information data item does not have information on all three colors for expressing one pixel, but has information on any one color of the three colors, is referred to as a Bayer array structure.

FIG. 1 is a diagram of a Bayer array. In the Bayer array of FIG. 1, a variety of interpolation methods may be used in order to obtain R, G, and B colors of each pixel, and the interpolation performance changes greatly depending on which interpolation method is selected.

First, an interpolation method using a first order filtering method will now be explained.

When a linear interpolation method is used, the G component of pixel (1,1) having information on the B component is expressed as the following equation:

$$G_{11} = \frac{G_{01} + G_{10} + G_{12} + G_{21}}{4}$$

In the linear interpolation method, the picture quality of a complex part of the image, for example, a region having a spatial edge, is deteriorated. An example of a spatial edge is a coin on a sheet of white paper. In this case, there is a spatial edge with no continuity of signal at the boundary between the paper and the coin.

To solve the problem, a method in which an edge component is divided into a horizontal direction component and a vertical direction component and then interpolation is applied to the direction having a smaller degree of edge slope, was proposed. For example, when the G component of pixel (1,1) of FIG. 1 is to be obtained, if the degree of horizontal direction edge slope is less than the degree of vertical direction edge slope, then $$G_{11} = \frac{G_{10} + G_{12}}{2},$$

and if the degree of vertical direction edge slope is less than the degree of horizontal edge slope, then $$G_{11} = \frac{G_{01} + G_{21}}{2}.$$

However, in the method, the picture quality of a part having a diagonal edge component is deteriorated.

To solve the problems of the above-described two methods, a method for using second order Laplacian filtering was proposed.

In the Laplacian filtering method, assuming that the difference between color signals in a local region of an image is constant ($G_i - R_i = \text{const1}$, $G_i - B_i = \text{const2}$, and $B_i - R_i = \text{const3}$, where i denotes the position of a pixel), a new interpolation method is applied. For example, if the edge component of the horizontal direction is less, the G component of pixel (2,2) of FIG. 1 is $$G_{22} = \frac{G_{21} + G_{23}}{2} + \frac{2R_{22} - R_{20} - R_{24}}{4}.$$

For a normal image, the method provides advantages of simplicity in hardware structure and high performance. However, in diagonal edges of some cases where the assumption is not true, for example, in a synthetic image, the method cannot solve the deterioration of picture quality as other existing methods.

SUMMARY OF THE INVENTION

To solve the above problems, it is a first objective of the present invention to provide an apparatus for processing output data from an image sensor, in which digital data output from an image sensor of an electronic camera is processed by using a plurality of directional coefficients.

It is a second objective of the present invention to provide a method for processing output data from an image sensor, in which digital data output from an image sensor of an electronic camera is processed by using a plurality of directional coefficients.

In accordance with one aspect of the present invention, there is provided an apparatus for processing the output data of an image sensor having a line memory module for receiving and storing the output data of a single image sensor, having information on color signals sensed in each pixel; a delay module for receiving the output data of the image sensor and the output data of the line memory module, delaying the received output data for a predetermined time using a clock signal, and then outputting the received output data; a directional coefficient value selector for receiving the output data of the delay module, selecting a plurality of directional coefficient values for defining the edge components of the Red (R), Green (G), and Blue (B) components of a pixel which is to be obtained, and outputting the selected values; and an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector.

It is preferable that the line memory module has a first line memory for storing the output data of the image sensor; a second line memory for storing the output data of the first line memory; a third line memory for storing the output data of the second line memory; and a fourth line memory for storing the output data of the third line memory.

It is preferable that the delay module includes a plurality of delay blocks, each of which has a plurality of serially connected shift registers and delays the output data of the image sensor.

It is preferable that the number of serially connected shift registers is 4 for each delay block.

It is preferable that the directional coefficient value selector has a calculating unit formed of a plurality of color component calculating units, each for determining whether the edge component in the horizontal direction and/or vertical direction and/or diagonal direction exists in each of R, G, and B components of an arbitrary pixel for which color components are to be obtained, and calculating the degree of the existing edge component; and a comparison determiner for determining the plurality of directional coefficient values by comparing the output data of the calculating unit with a predetermined number of thresholds.

It is preferable that depending on which color component an arbitrary pixel for which a color component is to be obtained has, the plurality of color component calculating units has a first color component calculating unit for obtaining the edge component of the G component if the pixel has the R component or the B component, and performing no operation if the pixel has the G component, a second color component calculating unit for obtaining the horizontal edge component of the R component if the pixel has the R component, obtaining the horizontal edge component of the G component if the pixel has the G component, and obtaining the horizontal edge component of the B component if the pixel has the B component; and a third color component calculating unit for obtaining the vertical edge component of the R component if the pixel has the R component, obtaining the vertical edge component of the G component if the pixel has the G component, and the vertical edge component of the B component if the pixel has the B component.

It is preferable that the first color component calculating unit calculates the difference between the absolute value of the G component which increases or decreases in the horizontal direction from an arbitrary pixel for which color components are to be obtained (the absolute value of the horizontal slope component of the G component), and the absolute value of the G component which increases or decreases in the vertical direction from the pixel (the absolute value of the vertical slope component of the G component).

It is preferable that assuming that the G component of arbitrary pixel (i,j) (where i and j are integers) is $G_{ij}$, the first color component calculating unit has a first function block for obtaining the absolute value of the difference (horizontal component) between $G_{(i+1)j}$ and $G_{(i-1)j}$; a second function block for obtaining the absolute value of the difference (vertical component) between $G_{i(j+1)}$ and $G_{i(j-1)}$; and a first subtracter for obtaining the difference between the output signal of the first function block and the output signal of the second function block.

It is preferable that the second color component calculating unit calculates the difference between the absolute value of the left slope component and the absolute value of the right slope component of the R component if the arbitrary pixel has the R component, calculates the difference between the absolute value of the left slope component and the absolute value of the right slope component of the G component if the arbitrary pixel has the G component, or calculates the difference between the absolute value of the left slope component and the absolute value of the right slope component of the B component if the arbitrary pixel has the B component, and the third color component calculating unit calculates the difference between the absolute value of the upper part slope of the R component and the absolute value of the lower part slope of the R component if the arbitrary pixel has the R component, calculates the difference between the absolute value of the upper part slope of the G component and the absolute value of the lower part slope of the G component if the arbitrary pixel has the G component, or calculates the difference between the absolute value of the upper part slope of the B component and the absolute value of the lower part slope of the B component if the arbitrary pixel has the B component.

It is preferable that assuming that the R component, the G component, and the B component of arbitrary pixel (i,j) (where i and j are integers) are $R_{ij}$, $G_{ij}$, and $B_{ij}$, respectively, the second color component calculating unit has a third function block for obtaining the absolute value of the difference between $R_{ij}$ and $R_{i(j+2)}$, obtaining the absolute value of the difference between $G_{ij}$ and $G_{i(j+2)}$, or obtaining the absolute value of the difference between $B_{ij}$ and $B_{i(j+2)}$; a fourth function block for obtaining the absolute value of the difference between $R_{i(j-2)}$ and $R_{ij}$, obtaining the absolute value of the difference between $G_{i(j-2)}$ and $G_{ij}$, or obtaining the absolute value of the difference between $B_{i(j-2)}$ and $B_{ij}$; and a second subtracter for obtaining the difference between the output signal of the third function block and the output signal of the fourth function block, and the third color component calculating unit has a fifth function block for obtaining the absolute value of the difference between $R_{ij}$ and $R_{(i+2)j}$, obtaining the absolute value of the difference between $G_{ij}$ and $G_{(i+2)j}$, or obtaining the absolute value of the difference between $B_{ij}$ and $B_{(i+2)j}$; a sixth function blcok for obtaining the absolute value of the difference between $R_{(i-2)j}$ and $R_{ij}$, obtaining the absolute value of the difference between $G_{(i-2)j}$ and $G_{ij}$, or obtaining the absolute value of the difference between $B_{(i-2)j}$ and $B_{ij}$; and a third subtracter for obtaining the difference between the output signal of the fourth function block and the output signal of the sixth function block.

It is preferable that the comparison determiner selects an arbitrary directional coefficient as a first state value if the output of the color component calculating unit is greater than the negative value of a threshold and less than the positive value of the treshold, selects the arbitrary directional coefficient as a second state value if the output is less than the negative value of the threshold, and selects the arbitrary directional coefficient as a third state value if the output is greater than the positive value of the threshold.

It is preferable that the first through third thresholds are integers greater than 4 and less than 20.

It is preferable that the first state value is ½, the second state value is 1, and the third state value is 0.

It is preferable that the adaptive interpolator has a G component interpolator for outputting the G component by performing interpolation according to the output signals of the delay module and the directional coefficient value selector; an R component interpolator for outputting the R component by performing interpolation according to the output signals of the delay module and the directional coefficient value selector; and a B component interpolator for outputting the B component by performing interpolation according to the output signals of the delay module and the directional coefficient value selector.

It is preferable that the G component interpolator has a low pass filter component calculator for receiving a plurality of G components from among the output signal of the delay module, performing calculation, selecting the result of calculation according to the output signal of the directional coefficient value, and outputting the selected result; a high pass filter component calculator for receiving a plurality of R components or B components from among the output signal of the delay module, performing calculation, selecting the result of calculation according to the output signal of the directional coefficient value, and outputting the selected result; and an adder for performing an OR operation on the output signal of the low pass filter component calculator and the output signal of the high pass filter component calculator.

It is preferable that the low pass filter component calcualtor has a first logic block unit having a plurality of logic blocks for performing OR operations on $G_{(i-1)j}$ and $G_{(i+1)j}$, $G_{i(j+1)}$ and $G_{(i+1)j}$, $G_{i(j+1)}$ and $G_{(i-1)j}$, $G_{i(j-1)}$ and $G_{(i+1)j}$, $G_{i(j-1)}$ and $G_{i(j+1)}$, respectively, of pixel (i,j) which is to be obtained, and dividing each OR result by 2; a second logic block unit having a plurality of logic blocks, each for selectively performing an OR operation on two of the output signals of the first logic block units and dividing the OR result by 2; and a first selector for selecting one of $G_{(i-1)j}$, $G_{i(j-1)}$, $G_{i(j+1)}$, and $G_{(i+1)j}$, the output signals of the first logic block units, and the output signals of the second logic block units, according to the output signal of the directional coefficient value selector, and outputting the selected one.

It is preferable that the high pass filter component calculator has a third logic block unit having a plurality of logic blocks for dividing the difference between $R_{ij}$ and $R_{(i+2)j}$ or the difference between $B_{ij}$ and $B_{(i+2)j}$ by 2, the difference between $R_{ij}$ and $R_{(i-1)j}$ or the difference between $B_{ij}$ and $B_{(i-2)j}$ by 2, the difference between $R_{ij}$ and $R_{i(j+2)}$ or the difference between $B_{ij}$ and $B_{i(j+2)}$ by 2, and the difference between $R_{ij}$ and $R_{i(j-2)}$ or the difference between $B_{ij}$ and $B_{i(j-2)}$ by 2; a fourth logic block unit having a plurality of logic blocks for selectively performing OR operations on the output signals of the third logic block unit and dividing the OR results by 2; a fifth logic block unit having a plurality of logic blocks for selectively performing OR operations on the output signals of the fourth logic block unit and dividing the OR results by 2; and a second selector for selecting one of the output signals of the third through the fifth logic block units, according to the output signal of the directional coefficient value selector.

It is preferable that the R component interpolator, if the R component is to be obtained for a pixel (i,j) of which the G component is known, selects one of $$R_{i(j+1)} + \frac{G_{ij} - G_{i(j+2)}}{2}, \frac{R_{i(j-1)} + R_{i(j+1)}}{2} + \frac{2G_{ij} - G_{i(j-2)} - G_{i(j+2)}}{4}$$

$$\text{and } R_{i(j-1)} + \frac{G_{ij} - G_{i(j-2)}}{2} \text{ in}$$

response to the second directional coefficient, and outputs the selected one, and if the R component is to be obtained for a pixel (i,j) of which the B component is known, obtains the arithmetic mean $$\left(\frac{R_{(i-1)(j-1)} + R_{(i-1)(j+1)} + R_{(i+1)(j-1)} + R_{(i+1)(j+1)}}{4}\right)$$

of four pixels in the diagonal direction from pixel (i,j) and outputs the result; and the B component interpolator, if the B component is to be obtained for a pixel (i,j) of which the G component is known, selects one of $$B_{i(j+1)} + \frac{G_{ij} - G_{i(j+2)}}{2}, \frac{B_{i(j-1)} + B_{i(j+1)}}{2} + \frac{2G_{ij} - G_{i(j-2)} - G_{i(j+2)}}{4}$$

$$\text{and } B_{i(j-1)} + \frac{G_{ij} - G_{i(j-2)}}{2}$$

in response to the third directional coefficient, and outputs the selected one, and if the B component is to be obtained for a pixel (i,j) of which the R component is known, obtains the arithmetic mean $$\left(\frac{B_{(i-1)(j-1)} + B_{(i-1)(j+1)} + B_{(i+1)(j-1)} + B_{(i+1)(j+1)}}{4}\right)$$

of four pixels in the diagonal direction from pixel (i,j) and outputs the result.

In accordance with another aspect of the present invention, there is provided a method for processing the output data of an image sensor for converting an input scene into an electronic signal, the method includes storing the output data of the image sensor; selecting at least three directional coefficient values for determining the intensity of color components of a pixel to be obtained by using the stored output data of the image sensor and the currently output data of the image sensor; and performing interpolation for obtaining the R and B components of a pixel having the G component, the G and B components of a pixel having the R component, and the G and R components of a pixel having the B component, by using the plurality of directional coefficients selected in the above step and the output data of the image sensor, wherein the directional coefficients include a first directional coefficient for indicating which component the edge of the pixel has from among the horizontal component, the vertical component, and the diagonal component, a second directional coefficient for indicating the degree of the horizontal edge component which has a predetermined width from the horizontal line, and includes the upper part component, the lower part component, and both the upper part and lower part components from the horizontal line, and a third directional coefficient for indicating the degree of the vertical edge component which has a predetermined width from the vertical line, and includes the left part component, the right part component, and both the left and right part components from the vertical line.

It is preferable that in the step for storing the output data of the image sensor, the output data of the image sensor is divided into a plurality of predetermined units, line memories, each for storing one unit, store at least 4 units of the divided data, and the predetermined unit is one line in the Bayer array structure.

It is preferable that the step for selecting the three directional coefficient values includes determining whether an arbitrary pixel for which color components are to be obtained already has the G component; selecting the second directional coefficient value and the third directional coefficient value one by one, if the arbitrary pixel has the G component already; if the color component of the arbitrary pixel is not the G component, determining whether the absolute value of the difference between the absolute value of the G component which increases or decreases in the horizontal direction from the arbitrary pixel (hereinafter referred to as 'the absolute value of the horizontal slope component of the G component), and the absolute value of the G component which increases or decreases in the vertical direction from the arbitrary pixel (hereinafter referred to as 'the absolute value of the vertical slope component of the G component) is less than a first threshold; if the absolute value of the difference between the absolute value of the horizontal slope component of the G component and the absolute value of the vertical slope component of the G component is less than the first threshold, setting the value of the first directional coefficient to a first state value, and selecting the value of the second directional coefficient; determining whether the difference between the absolute value of the horizontal slope component of the G component and the absolute value of the vertical slope component of the G component is less than the negative value of the first threshold; if the difference between the absolute value of the horizontal slope component of the G component and the absolute value of the vertical slope component of the G component is less than the negative value of the first threshold, setting the value of the first directional coefficient to a second state value, and selecting the value of the second directional coefficient; if the difference between the absolute value of the horizontal slope component of the G component and the absolute value of the vertical slope component of the G component is greater than the positive value of the first threshold, setting the value of the first directional coefficient to a third state value; and if the value of the first directional coefficient is set to the first state value or the third state value, continuously selecting the value of the third directional coefficient.

It is preferable that the difference between the absolute value of the horizontal slope component of the G component and the absolute value of the vertical slope component of the G component is $|G_{i(j+1)}-G_{i(j-1)}|-|G_{(i-1)j}-G_{(i+1)j}|$, where the G component of pixel (i,j) to be obtained is $G_{ij}$, and i and j are integers.

It is preferable that the step for selecting the second directional coefficient value and the third directional coefficient value one by one, when the pixel to be obtained already has the G component, includes determining whether the absolute value of the difference between the absolute value of the G component of pixels to the left of the arbitrary pixel which increases or decreases in the horizontal direction (hereinafter referred to as 'the absolute value of the left slope component of the G component'), and the absolute value of the G component of pixels to the right of the arbitrary pixel which increases or decreases in the horizontal direction (hereinafter referred to as 'the absolute value of the right slope component of the G component') is less than a second threshold; if the absolute value of the difference between the absolute value of the left slope component of the G component and the absolute value of the right slope component of the G component is less than the second threshold, setting the value of the second directional coefficient to the first state value; determining whether the difference between the absolute value of the left slope component of the G component and the absolute value of the right slope component of the G component is less than the negative value of the second threshold; if the difference between the absolute value of the left slope component of the G component and the absolute value of the right slope component of the G component is less than the negative value of the second threshold, setting the value of the second directional coefficient to the second state value; if the difference between the absolute value of the left slope component of the G component and the absolute value of the right slope component of the G component is greater than the second threshold, setting the value of the second directional coefficient to the third state value; determining, based on the second directional coefficient value determined in the above step, whether the absolute value of the difference between the absolute value of the G component of pixels above the arbitrary pixel which increases or decreases in the vertical direction (hereinafter referred to as 'the absolute value of the upper part slope component of the G component') and the absolute value of the G component of pixels below the arbitrary pixel which increases or decreases in the vertical direction (hereinafter referred to as 'the absolute value of the lower part slope component of the G component') is less than a third threshold; if the absolute value of the difference between the absolute value of the upper part slope component of the G component and the absolute value of the lower part slope component of the G component is less than the third threshold, setting the value of the third directional coefficient to the first state value; determining whether the difference between the absolute value of the upper part slope component of the G component and the absolute value of the lower part slope component of the G component is less than the negative value of the third threshold; if the difference between the absolute value of the upper part slope component of the G component and the absolute value of the lower part slope component of the G component is less than the negative value of the third threshold, setting the value of the third directional coefficient to the second state value; and if the difference between the absolute value of the upper part slope component of the G component and the absolute value of the lower part slope component of the G component is greater than the third threshold, setting the value of the third directional coefficient to the third state value.

It is preferable that when the G component of pixel (i,j) to be obtained is $G_{ij}$, and i and j are integers, the difference between the absolute value of the left slope component of the G component and the absolute value of the right slope component of the G component is $|G_{ij}-G_{i(j-2)}|-|G_{ij}-G_{i(j+2)}|$ and the difference between the absolute value of the upper part slope component of the G component and the absolute value of the lower part slope component of the G component is $|G_{ij}-G_{(i-2)j}|-|G_{ij}-G_{(i+2)j}|$.

It is preferable that the step for setting the first directional coefficient value to the second state value and selecting the second directional coefficient value includes determining whether the color component the arbitrary pixel has is the R component; when the arbitrary pixel has the R component, determining whether the absolute value of the difference between the absolute value of the R component of pixels to the left of the arbitrary pixel which increases or decreases in the horizontal direction (hereinafter referred to as 'the absolute value of the left slope component of the R component'), and the absolute value of the R component of pixels to the right of the arbitrary pixel which increases or decreases in the horizontal direction (hereinafter referred to as 'the absolute value of the right slope component of the R component') is less than the second threshold; if the absolute value of the difference between the absolute value of the left slope component of the R component and the absolute value of the right slope component of the R component is less than the second threshold, setting the value of the second directional coefficient to the first state value; determining whether the difference between the absolute value of the left slope component of the R component and the absolute value of the right slope component of the R component is less than the negative value of the second threshold; if the difference between the absolute value of the left slope component of the R component and the absolute value of the right slope component of the R component is less than the negative value of the second threshold, setting the value of the second directional coefficient to the second state value; if the difference between the absolute value of the left slope component of the R component and the absolute value of the right slope component of the R component is greater than the second threshold, setting the value of the second directional coefficient to the third state value; when the arbitrary pixel does not have the R component, determining whether the absolute value of the difference between the absolute value of the B component of pixels to the left of the arbitrary pixel which increases or decreases in the horizontal direction (hereinafter referred to as 'the absolute value of the left slope component of the B component'), and the absolute value of the B component of pixels to the right of the arbitrary pixel which increases or decreases in the horizontal direction (hereinafter referred to as 'the absolute value of the right slope component of the B component') is less than the second threshold; if the absolute value of the difference between the absolute value of the left slope component of the B component and the absolute value of the right slope component of the B component is less than the second threshold, setting the value of the second directional coefficient to the first state value; determining whether the difference between the absolute value of the left slope component of the B component and the absolute value of the right slope component of the B component is less than the negative value of the second threshold; if the difference between the absolute value of the left slope component of the B component and the absolute value of the right slope component of the B component is less than the negative value of the second threshold, setting the value of the second directional coefficient to the second state value; and if the difference between the absolute value of the left slope component of the B component and the absolute value of the right slope component of the B component is greater than the second threshold, setting the value of the second directional coefficient to the third state value.

It is preferable that when the R component of pixel (i,j) to be obtained is $R_{ij}$ and i and j are integers, the difference between the absolute value of the left slope component of the R component and the absolute value of the right slope component of the R component is $|R_{ij}-R_{i(j-2)}|-|R_{ij}-R_{i(j+2)}|$, and when the B component of pixel (i,j) to be obtained is $B_{ij}$ and i and j are integers, the difference ($\Delta B_h$) of the absolute value of the left slope component of the B component and the absolute value of the right slope component of the B component is $|B_{ij}-B_{i(j-2)}|-|B_{ij}-B_{i(j+2)}|$.

It is preferable that the step for continuously selecting the value of the third directional coefficient, if the value of the first directional coefficient is set to the first state value or the third state value, includes determining determined whether the color component of the arbitrary pixel is the R component; if the color component of the pixel is the R component, determining whether the absolute value of the difference between the absolute value of the R component of pixels above the arbitrary pixel which increases or decreases in the vertical direction (hereinafter referred to as 'the absolute value of the upper part slope component of the R component') and the absolute value of the R component of pixels below the arbitrary pixel which increases or decreases in the vertical direction (hereinafter referred to as 'the absolute value of the lower part slope component of the R component') is less than the third threshold; if the absolute value of the difference between the absolute value of the upper part slope component of the R component and the absolute value of the lower part slope component of the R component is less than the third threshold, setting the value of the third directional coefficient to the first state value; determining whether the difference between the absolute value of the upper part slope component of the R component and the absolute value of the lower part slope component of the R component is less than the negative value of the third threshold; if the difference between the absolute value of the upper part slope component of the R component and the absolute value of the lower part slope component of the R component is less than the negative value of the third threshold, setting the value of the third directional coefficient to the second state value; if the difference between the absolute value of the upper part slope component of the R component and the absolute value of the lower part slope component of the R component is greater than the third threshold, setting the value of the third directional coefficient to the third state value; if the color component of the arbitrary pixel is not the R component, determining whether the absolute value of the difference between the absolute value of the B component of pixels above the arbitrary pixel which increases or decreases in the vertical direction (hereinafter referred to as 'the absolute value of the upper part slope component of the B component') and the absolute value of the B component of pixels below the arbitrary pixel which increases or decreases in the vertical direction (hereinafter referred to as 'the absolute value of the lower part slope component of the B component') is less than the third threshold; if the absolute value of the difference between the absolute value of the upper part slope component of the B component and the absolute value of the lower part slope component of the B component is less than the third threshold, setting the value of the third directional coefficient to the first state value; determining whether the difference between the absolute value of the upper part slope component of the B component and the absolute value of the lower part slope component of the B component is less than the negative value of the third threshold; if the difference between the absolute value of the upper part slope component of the B component and the absolute value of the lower part slope component of the B component is less than the negative value of the third threshold, setting the value of the third directional coefficient to the second state value; and if the difference between the absolute value of the upper part slope component of the B component and the absolute value of the lower part slope component of the B component is greater than the third threshold, setting the value of the third directional coefficient to the third state value.

It is preferable that the difference between the absolute value of the upper part slope component of the R component and the absolute value of the lower part slope component of the R component is $|R_{ij}-R_{(i-2)j}|-|R_{ij}-R_{(i+2)j}|$, where the R component of pixel (i,j) to be obtained is $R_{ij}$, and i and j are integers, and the difference between the absolute value of the upper part slope component of the B component and the absolute value of the lower part slope component of the B component is $|B_{ij}-B_{(i-2)j}|-|B_{ij}-B_{(i+2)j}|$, where the B component of pixel (i,j) to be obtained is $B_{ij}$, and i and j are integers.

It is preferable that the first state value is ½, the second state value is 1, and the third state value is 0.

It is preferable that the first through the third threshold are integers greater than 4 and less than 20.

It is preferable that the step for performing interpolation includes calculating the output data of the image sensor, and with respect to selected directional coefficient values, selecting data items which correspond to the selected directional coefficient values from among the calculated data, as the R component; calculating the output of the image sensor, and with respect to selected directional coefficient values, selecting data items which correspond to the selected directional coefficient values from among the calculated data, as the G component; and calculating the output of the image sensor, and with respect to selected directional coefficient values, selecting data items which correspond to the selected direction coefficient values from among the calculated data, as the B component.

It is preferable that one or more state values are further included, and the state values are used to indicate the degree of slope of edges which have diagonal components having different slopes, edges which have horizontal components having different slopes, and edges which have vertical components having different slopes.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 14 illustrates 19 types of edges that can be processed by the method for processing the output data from an image sensor according to the present invention.

FIG. 15 is a table classifying edges which can be processed by three directional coefficients ($\alpha_d$, $\alpha_h$, and $\alpha_v$) for determining the, G value of an arbitrary pixel (2,2).

FIG. 16 is a table classifying R components of pixel (2,3) with respect to directional coefficient $\alpha_h$, and edge types which satisfy the R components.

DESCRIPTION OF THE PREFERRED EMBODIMENTS

Figures 1, 2:
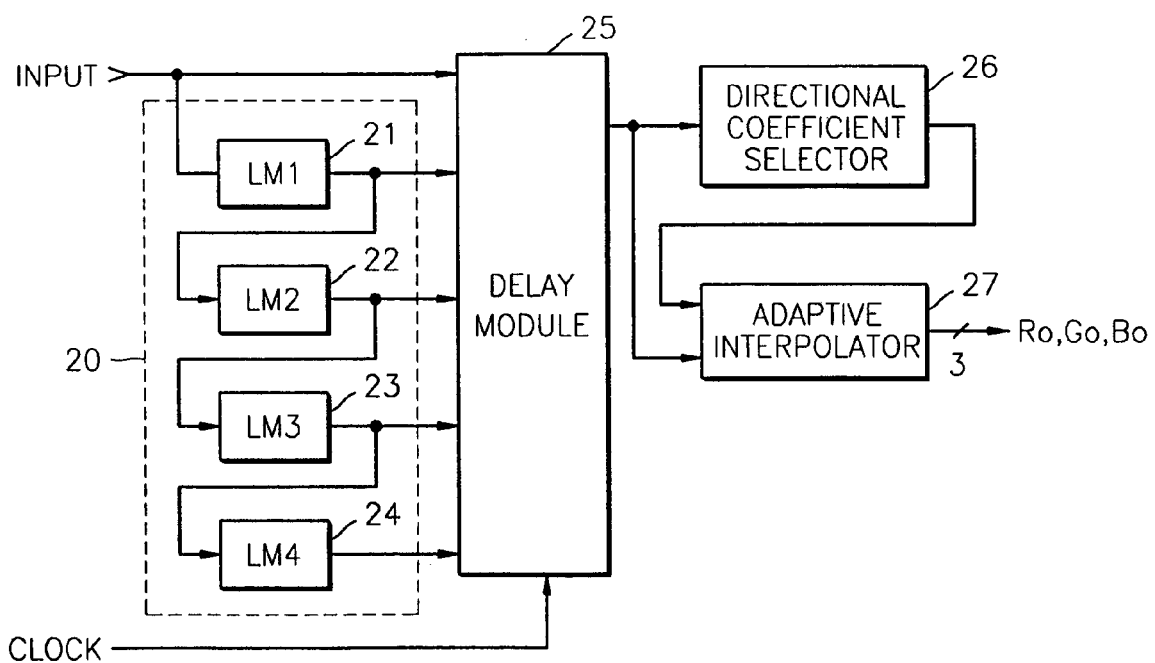
FIG. 1 is a diagram of a Bayer array.
FIG. 2 is a block diagram of an apparatus for processing the output data from an image sensor according to a preferred embodiment of the present invention.

FIG. 2 is a block diagram of an apparatus for processing the output data from an image sensor according to a preferred embodiment of the present invention. Referring to FIG. 2, the apparatus for processing the output data from an image sensor according to the present invention includes a line memory module 20, a delay module 25, a directional coefficient value selector 26, and an adaptive interpolator 27.

The line memory module 20 receives and stores data which is output from a single image sensor and has information on color signals sensed in each pixel. The delay module 25 receives the data output from the image sensor and data output from the line memory module 20, delays the received data for a predetermined time using a clock signal, and then outputs the data.

The directional coefficient value selector 26 receives data output from the delay module 25, selects a plurality of directional coefficient values for defining edge components of R, G, and B components of a pixel which is to be obtained using the output data of the delay module 25, and outputs the selected values. The adaptive interpolator 27 receives the data output from the delay module 25, and, in response to the output data of the directional coefficient value selector 26, interpolates the received output data of the delay module 25 to obtain the R and B components of a pixel having only the G component, the G and B components of a pixel having only the R component, and the G and R components of a pixel having only the B component.

The line memory module 20 includes a first line memory 21 for storing the output data (INPUT) of the image sensor, a second line memory 22 for storing the output data of the first line memory 21, a third line memory 23 for storing the output data of the second line memory 22, and a fourth line memory 24 for storing the output data of the third line memory 23.

Figure 3:
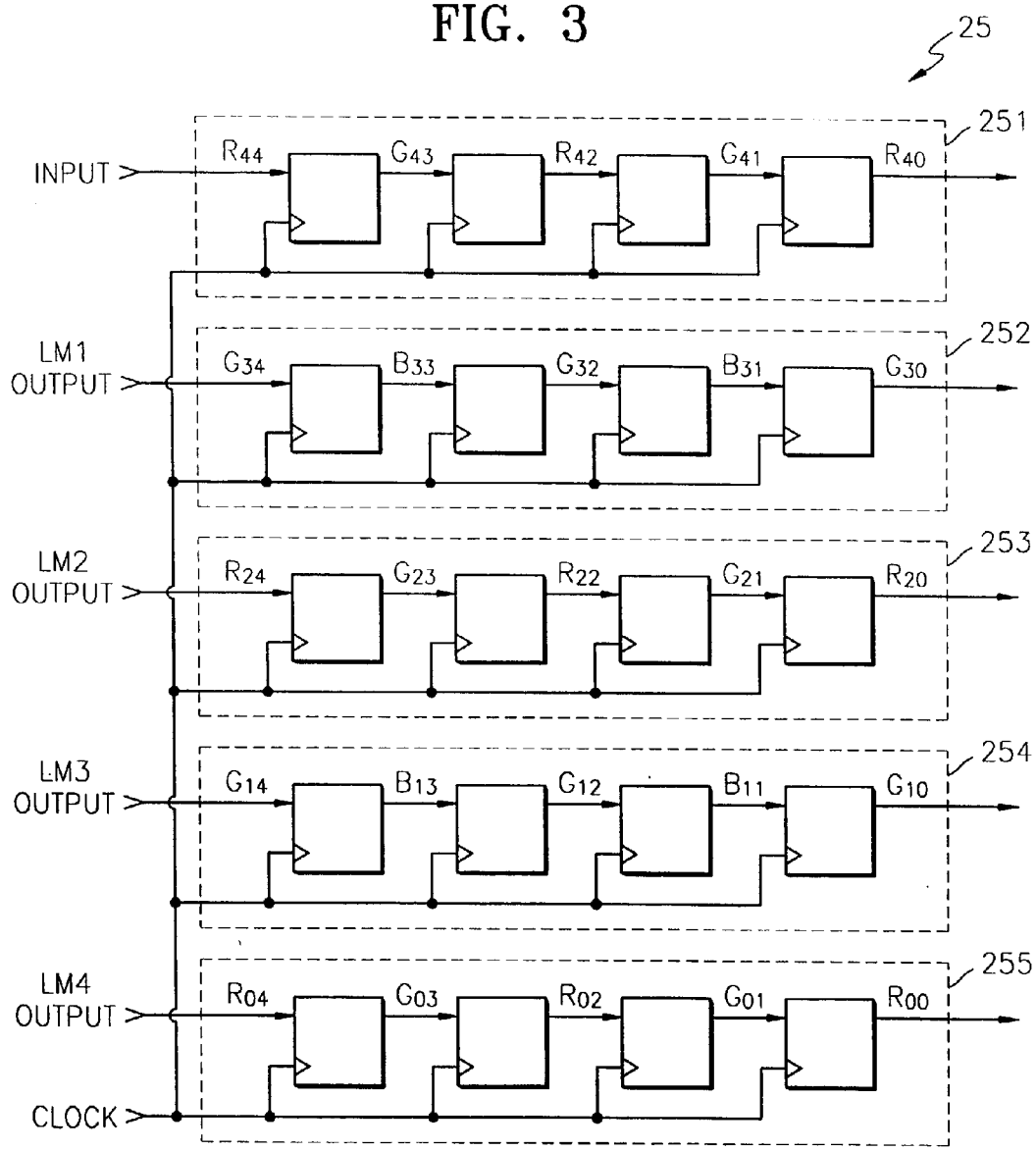
FIG. 3 is a circuit diagram of a delay module of FIG. 2.

FIG. 3 is a circuit diagram of the delay module 25 of FIG. 2. Referring to FIG. 3, the delay module 25 includes a first delay block 251 through a fifth delay block 255.

Each of the first through fifth delay blocks 251 through 255 operates according to a clock signal (CLOCK), and has four shift registers which are serially connected. The first delay block 251 delays the output data (INPUT) of the image sensor. The second delay block 252 delays the output data of the first line memory 21. The third delay block 253, the fourth delay block 254, and the fifth delay block 255 delay the output data of the second line memory 22, the third line memory 23, and the fourth line memory 24, respectively.

Figure 4:
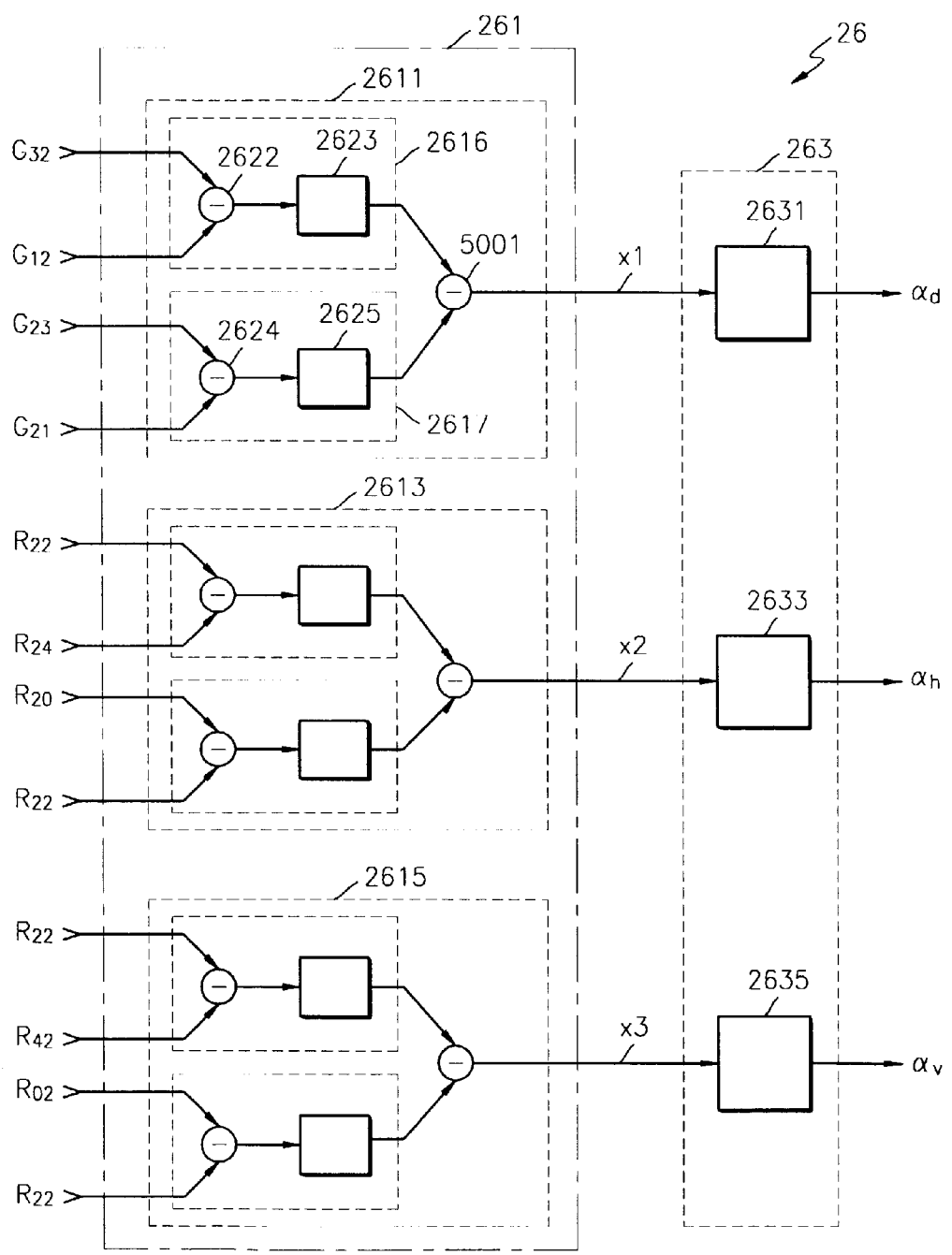
FIG. 4 is a circuit diagram of a directional coefficient value selector of FIG. 2.

FIG. 4 is a circuit diagram of the directional coefficient value selector 26 of FIG. 2. Referring to FIG. 4, the directional coefficient value selector 26 includes a calculating unit 261 for determining whether the edge component in the horizontal direction and/or vertical direction and/or diagonal direction exists in each of R, G, and B components of an arbitrary pixel for which color components are to be obtained and calculating the degree of the edge component, and a comparison determiner 263 for determining at least three directional coefficient values by comparing the output data of the calculating unit 261 with at least three thresholds.

The calculating unit 261 includes first, second, and third color component calculating units 2611, 2613 and 2615, which obtain edge components depending on which color component an arbitrary pixel to be obtained already has. That is, the calculating unit 261 has the first color component calculating unit 2611 for obtaining the edge component of the G component if the pixel has the R component or the B component, and performing no operation if the pixel has the G component, the second color component calculating unit 2613 for obtaining the horizontal edge component of the R component if the pixel has the R component, obtaining the horizontal edge component of the G component if the pixel has the G component, and obtaining the horizontal edge component of the B component if the pixel has the B component, and the third color component calculating unit 2615 for obtaining the vertical edge component of the R component if the pixel has the R component, obtaining the vertical edge component of the G component if the pixel has the G component, and obtaining the vertical edge component of the B component if the pixel has the B component. Assuming that the R component of pixel (2,2) is to be obtained, the color components for the calculating unit 261 are marked.

The operation of the calculating unit will now be described in more detail.

The first color component calculating unit 2611 calculates the difference between the absolute value of the G component which increases or decreases in the horizontal direction from an arbitrary pixel for which color components are to be obtained (the absolute value of the horizontal slope component of the G component), and the absolute value of the G component which increases or decreases in the vertical direction from that pixel (the absolute value of the vertical slope component of the G component).

If the arbitrary pixel has the R component, the second color component calculating unit 2613 calculates the difference between the absolute value of the R component of pixels to the left of the arbitrary pixel which increases or decreases in the horizontal direction (the absolute value of the left slope component of the R component), and the absolute value of the R component of pixels to the right of the arbitrary pixel which increases or decreases in the horizontal direction (the absolute value of the right slope component of the R component).

If the arbitrary pixel has the G component, the second color component calculating unit 2613 calculates the difference between the absolute value of the G component of pixels to the left of the arbitrary pixel which increases or decreases in the horizontal direction (the absolute value of the left slope component of the G component), and the absolute value of the G component of pixels to the right of the arbitrary pixel which increases or decreases in the horizontal direction (the absolute value of the right slope component of the G component).

If the arbitrary pixel has the B component, the second color component calculating unit 2613 calculates the difference between the absolute value of the B component of pixels to the left of the arbitrary pixel which increases or decreases in the horizontal direction (the absolute value of the left slope component of the B component), and the absolute value of the B component of pixels to the right of the arbitrary pixel which increases or decreases in the horizontal direction (the absolute value of the right slope component of the B component).

If the arbitrary pixel has the R component, the third color component calculating unit 2615 calculates the difference between the absolute value of the R component of pixels above the arbitrary pixel which increases or decreases in the vertical direction (the absolute value of the upper part slope component of the R component) and the absolute value of the R component of pixels below the arbitrary pixel which increases or decreases in the vertical direction (the absolute value of the lower part slope component of the R component).

If the arbitrary pixel has the G component, the third color component calculating unit 2615 calculates the difference between the absolute value of the G component of pixels above the arbitrary pixel which increases or decreases in the vertical direction (the absolute value of the upper part slope component of the G component) and the absolute value of the G component of pixels below the arbitrary pixel which increases or decreases in the vertical direction (the absolute value of the lower part slope component of the G component).

If the arbitrary pixel has the B component, the third color component calculating unit 2615 calculates the difference between the absolute value of the B component of pixels above the arbitrary pixel which increases or decreases in the vertical direction (the absolute value of the upper part slope component of the B component) and the absolute value of the B component of pixels below the arbitrary pixel which increases or decreases in the vertical direction (the absolute value of the lower part slope component of the B component).

The first color component calculating unit 2611 includes a first function block 2616, a second function block 2617, and a first subtracter 5001. The first function block 2616 includes a second subtracter 2622 for obtaining the color component difference between $G_{32}$ and $G_{12}$, and a first block 2623 for obtaining the absolute value of the output data of the second subtracter 2622. The second function block 2617 includes a third subtracter 2624 for obtaining the color component difference between $G_{23}$ and $G_{21}$, and a second block 2625 for obtaining the absolute value of the output data of the third subtracter 2624. The first subtracter 5001 obtains the difference between the output data of the first function block 2616 and the output data of the second function block 2617, and outputs the difference (×1).

The second color component calculating unit 2613 is formed of a circuit having the same structure as that of the first color component calculating unit 2611, and obtains the absolute value of the color component difference between $R_{22}$ and $R_{24}$, and the absolute value of the color component difference between $R_{22}$ and $R_{20}$, and outputs the difference (×2) between the two absolute values.

The third color component calculating unit 2615 is formed of a circuit having the same structure as that of the first color component calculating unit 2611, and obtains the absolute value of the color component difference between $R_{22}$ and $R_{42}$, and the absolute value of the color component difference between $R_{22}$ and $R_{02}$, and outputs the difference (×3) between the two absolute values.

The comparison determiner 263 includes a first comparison determiner 2631, a second comparison determiner 2633, and a third comparison determiner 2635.

The first comparison determiner 2631 selects a first directional coefficient as a first state value if the output (×1) of the first color component calculating unit 2611 is greater than the negative value of a first threshold and less than the positive value of the first threshold; selects the first directional coefficient as a second state value if the output (×1) of the first color component calculating unit 2611 is less than the negative value of the first threshold; and selects the first directional coefficient as a third state value if the output (×1) of the first color component calculating unit 2611 is greater than the positive value of the first threshold. Then, the first comparison determiner 2631 outputs the first directional coefficient ($\alpha_d$).

The second comparison determiner 2633 selects a second directional coefficient as the first state value if the output (×2) of the second color component calculating unit 2613 is greater than the negative value of a second threshold and less the positive value of the second threshold; selects the second directional coefficient as the second state value if the output (×2) of the second, color component calculating unit 2613 is less than the negative value of the second threshold; and selects the second directional coefficient as the third state value if the output (×2) of the second color component calculating unit 2613 is greater than the positive value of the second threshold. Then, the second comparison determiner 2633 outputs the second directional coefficient ($\alpha_h$).

The third comparison determiner 2635 selects a third directional coefficient as the first state value if the output (×3) of the third color component calculating unit 2615 is greater than the negative value of a third threshold and less than the positive value of the third threshold; selects the third directional coefficient as the second state value if the output (×3) of the third color component calculating unit 2615 is less than the negative value of the third threshold; and selects the third directional coefficient as the third state value if the output (×3) of the third color component calculating unit 2615 is greater than the positive value of the third threshold. Then, the third comparison determiner 2635 outputs the third directional coefficient ($\alpha_v$).

In one embodiment, the first threshold through the third threshold are integers greater than 4 and less than 20, the first state value is ½, the second state value is 1, and the third state is 0.

Figure 5:
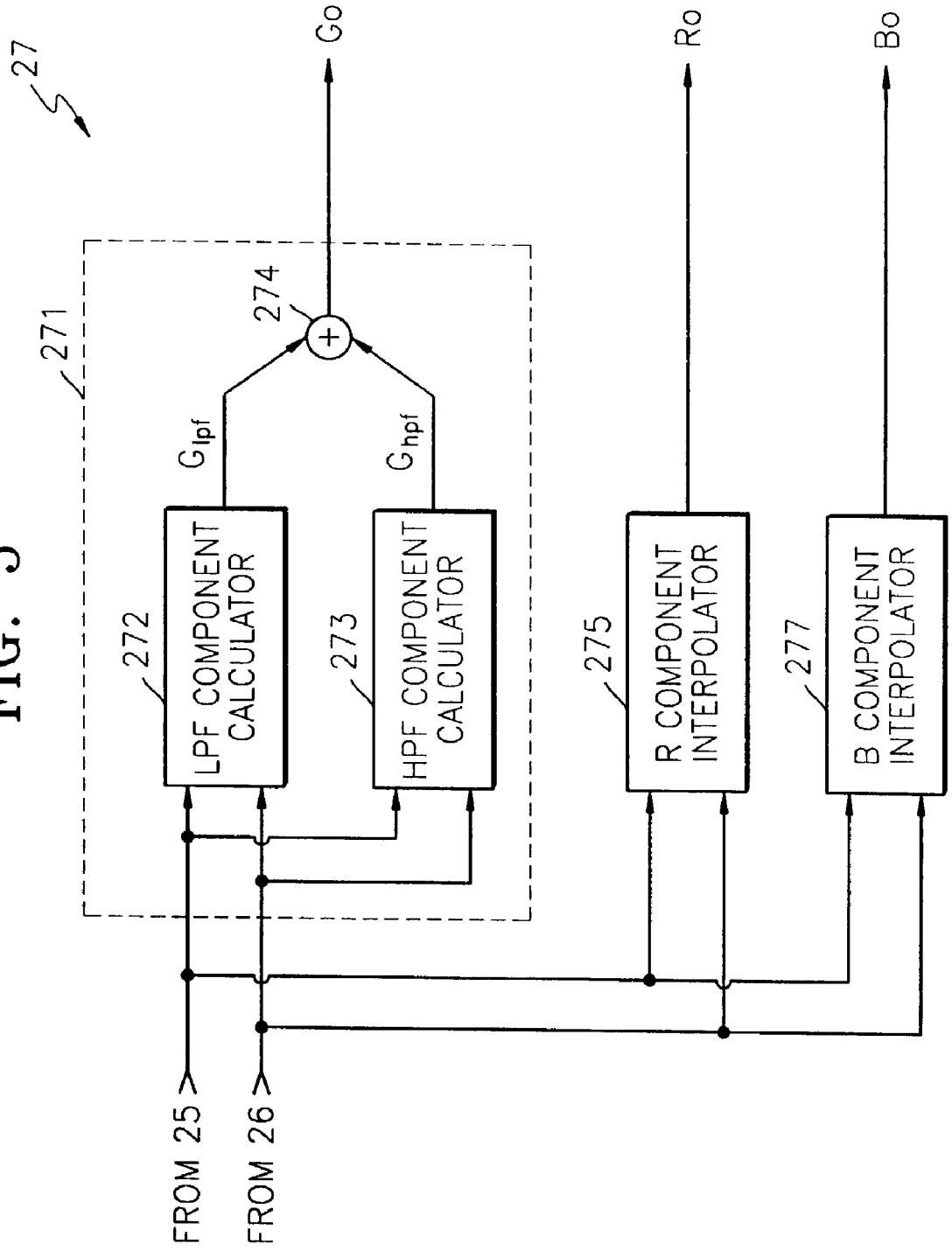
FIG. 5 is a circuit diagram of an adaptive interpolator of FIG. 2.

FIG. 5 is a circuit diagram of the adaptive interpolator 27 of FIG. 2. Referring to FIG. 5, the adaptive interpolator 27 includes a G component interpolator 271, an R component interpolator 275, and a B component interpolator 277.

The G component interpolator 271 includes a Low Pass Filter (LPF) component calculator 272, a High Pass Filter (HPF) component calculator 273, and a first adder 274.

The LPF component calculator 272 receives a plurality of G components from among the output signals of the delay module 25, performs calculation, selects the calculation result according to the output signal of the directional coefficient value selector 26, and outputs the calculation result ($G_{lpf}$).

The HPF component calculator 273 receives a plurality of R components or B components from among the output signals of the delay module 25, performs calculation, selects the calculation result according to the output signal of the directional coefficient value selector 26, and outputs the calculation result ($G_{hpf}$).

The first adder 274 includes an adder for performing an OR operation on the output signal ($G_{lpf}$) of the LPF component calculator 272 and the output signal ($G_{hpf}$) of the HPF component calculator 273.

The R component interpolator 275, if the R component of pixel (i,j) of which the G component is known is to be obtained, in response to the second directional coefficient ($\alpha_h$), selects one of $$R_{i(j+1)} + \frac{G_{ij} - G_{i(j+2)}}{2}, \frac{R_{i(j-1)} + R_{i(j+1)}}{2} + \frac{2G_{ij} - G_{i(j-2)} - G_{i(j+2)}}{4}$$

$$\text{and } R_{i(j-1)} + \frac{G_{ij} - G_{i(j-2)}}{2},$$

and outputs the selected one ($R_O$), and if the R component of pixel (i,j) of which the B component is known is to be obtained, obtains the arithmetic mean $$\left( \frac{R_{(i-1)(j-1)} + R_{(i-1)(j+1)} + R_{(i+1)(j-1)} + R_{(i+1)(j+1)}}{4} \right)$$

of four pixels in the diagonal direction from pixel (i,j) and outputs the result ($R_O$).

The B component interpolator 277, if the B component of pixel (i,j) of which the G component is known is to be obtained, in response to the third directional coefficient ($\alpha_v$), selects one of $$B_{i(j+1)} + \frac{G_{ij} - G_{i(j+2)}}{2}, \frac{B_{i(j-1)} + B_{i(j+1)}}{2} + \frac{2G_{ij} - G_{i(j-2)} - G_{i(j+2)}}{4}$$

$$\text{and } B_{i(j-1)} + \frac{G_{ij} - G_{i(j-2)}}{2},$$

and outputs the selected one ($B_O$), and if the B component of pixel (i,j) of which the R component is known is to be obtained, obtains the arithmetic mean $$\left( \frac{B_{(i-1)(j-1)} + B_{(i-1)(j+1)} + B_{(i+1)(j-1)} + B_{(i+1)(j+1)}}{4} \right)$$

of four pixels in the diagonal direction from pixel (i,j) and outputs the result ($B_O$).

Figure 6:
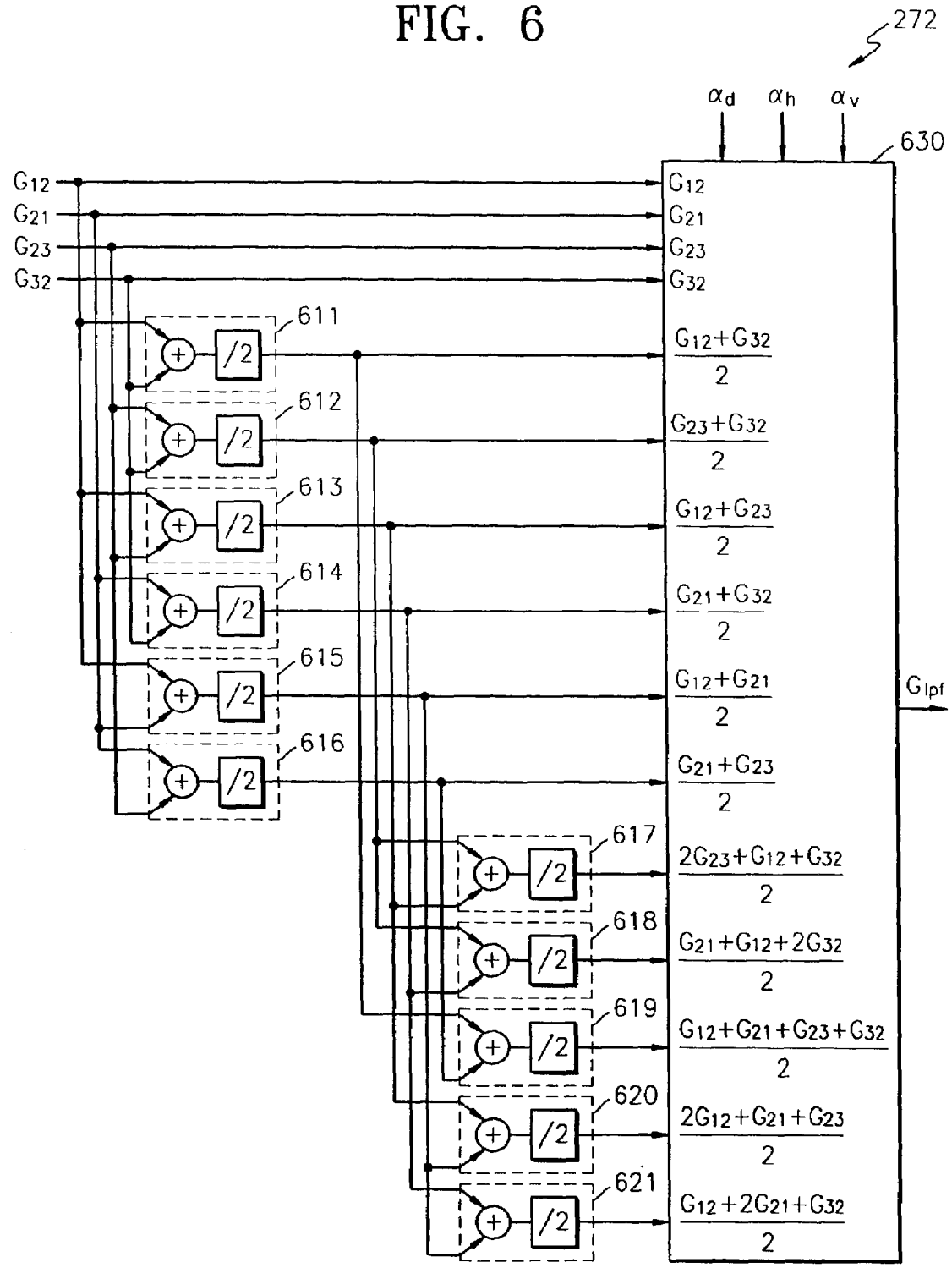
FIG. 6 is a circuit diagram of a low pass filter component calculator of FIG. 5.

FIG. 6 is a circuit diagram of the LPF component calculator 272 of FIG. 5. Referring to FIG. 6, the LPF component calculator 272 includes a first logic block unit (a set of 611 through 616), a second logic block unit (a set of 617 through 621), and a first selector 630.

The first logic block unit 611 through 616 includes a plurality of logic blocks 611 through 616 for performing OR operations on $G_{12}$ and $G_{32}$, $G_{23}$ and $G_{32}$, $G_{23}$ and $G_{12}$, $G_{21}$ and $G_{32}$, $G_{21}$, and $G_{12}$, and $G_{23}$ and $G_{21}$, respectively, and dividing each OR result by 2.

The second logic block unit 617 through 621 includes a plurality of logic blocks 617 through 621, each for selecting two of the output signals of the first logic block units 611 through 616 and dividing the selected output by 2.

The first selector 630, in response to the output signals ($\alpha_d$, $\alpha_h$, and $\alpha_v$) of the directional coefficient value selector 26, selects one of $G_{12}$, $G_{21}$, $G_{23}$ and $G_{32}$ the output signals of the first logic block units 611 through 616, and the output signals of the second logic block units 617 through 621, and outputs the selected one ($G_{lpf}$).

Figure 7:
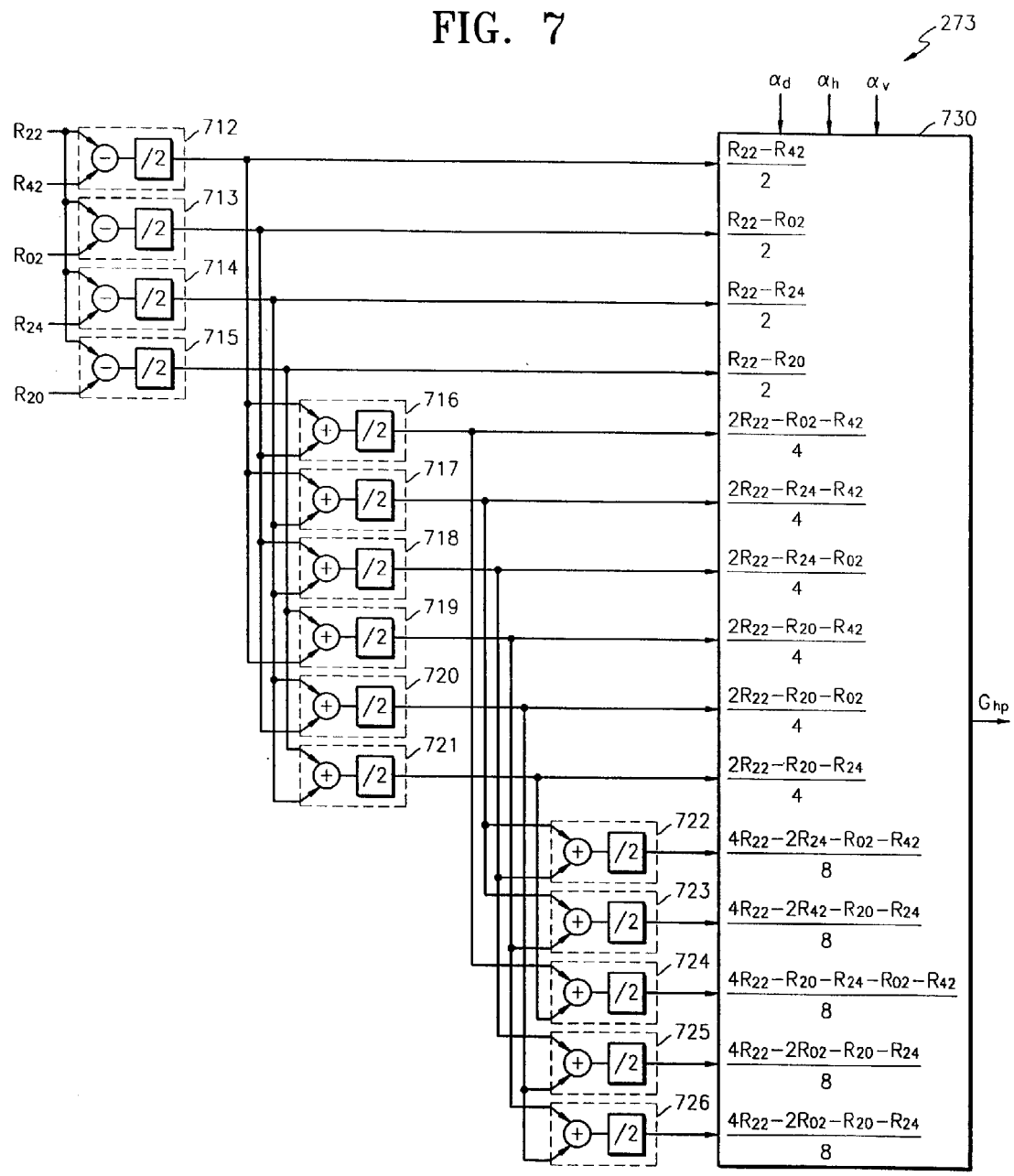
FIG. 7 is a circuit diagram of a high pass filter component calculator of FIG. 5.

FIG. 7 is a circuit diagram of the HPF component calculator 273 of FIG. 5. Referring to FIG. 7, the HPF component calculator 273 includes a third logic block unit 712 through 715, a fourth logic block unit 716 through 721, a fifth logic block unit 722 through 726, and a second selector 730.

The third logic block unit 712 through 715 includes a plurality of logic blocks 712 through 715 for dividing the difference between $R_{22}$ and $R_{42}$ (or the difference between $B_{22}$ and $B_{42}$) by 2, the difference between $R_{22}$ and $R_{02}$ (or the difference between $B_{22}$ and $B_{02}$) by 2, the difference between $R_{22}$ and $R_{24}$ (or the difference between $B_{22}$ and $B_{24}$) by 2, and the difference between $R_{22}$ and $R_{20}$ (or the difference between $B_{22}$ and $B_{20}$), by 2.

The fourth logic block unit 716 through 721 includes a plurality of logic blocks 716 through 721 for selecting two different output signals from among the plurality of output signals from the third logic block unit 712 through 715, performing an OR operation on the selected signals, and dividing the OR results by 2.

The fifth logic block unit 722 through 726 includes a plurality of logic blocks 722 through 726 for selecting two different output signals from among the plurality of output signals from the fourth logic block unit 716 through 721, performing an OR operation on the selected signals, and dividing the OR results by 2.

The second selector 730, in response to the output signals ($\alpha_d$, $\alpha_h$, and $\alpha_v$) of the directional coefficient value selector 26, selects one of the output signals of the 12 logic block 712 through the 26 logic block 726, and outputs the selected signal ($G_{lpf}$).

Figure 8:
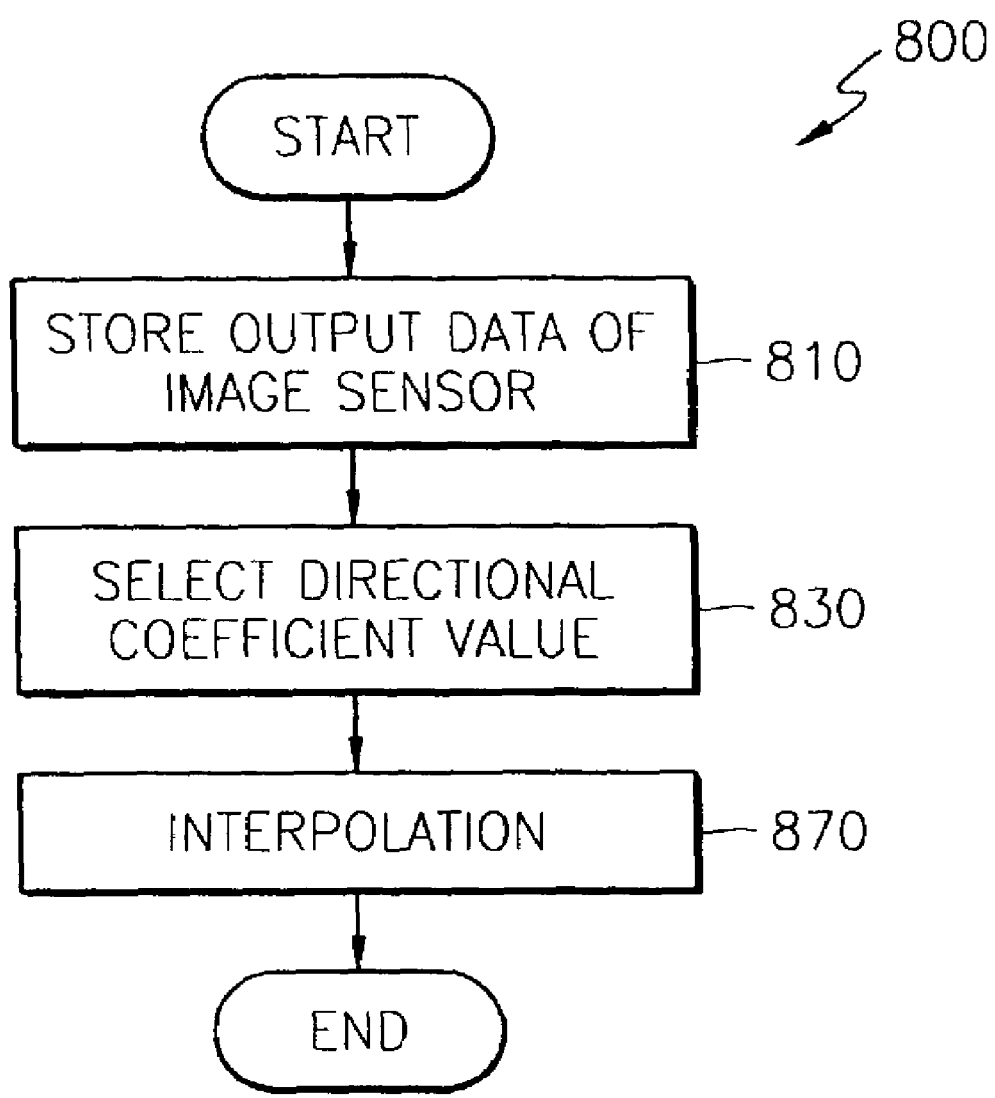
FIG. 8 is a flowchart of a method for processing the output data from an image sensor according to a preferred embodiment of the present invention.

FIG. 8 is a flowchart of a method for processing the output data from an image sensor according to a preferred embodiment of the present invention. Referring to FIG. 8, the method for processing the output data from an image sensor according to the present invention has the steps 810 through 870.

In the method for processing the output data from an image sensor which converts an input scene to an electronic signal, the output data of the image sensor is stored in step 810.

In step 830, at least three directional coefficient values, for determining the intensity of color components of a pixel to be obtained by using the stored output data of the image sensor and the currently output data of the image sensor, are selected.

In step 870, by using the plurality of directional coefficients selected in step 830 and the output data of the image sensor, interpolation is performed in order to obtain the R and B components of a pixel having the G component, the G and B components of a pixel having the R component, and the G and R components of a pixel having the B component.

Here, the directional coefficients include a first directional coefficient for indicating which component the edge of the pixel has, among the horizontal component, the vertical component, and the diagonal component, a second directional coefficient for indicating the degree of the horizontal edge component which has a predetermined width from the horizontal line, and includes the upper part component, the lower part component, and both the upper part and lower part components from the horizontal line, and a third directional coefficient for indicating the degree of the vertical edge component which has a predetermined width from the vertical line, and includes the left part component, the right part component, and both the left and right part components from the vertical line.

Preferably, in step 810, the output data of the image sensor is divided into a plurality of predetermined units, and line memories for each storing one unit store at least four units of the divided data, where the predetermined unit is one line in the Bayer array structure.

Figure 9:
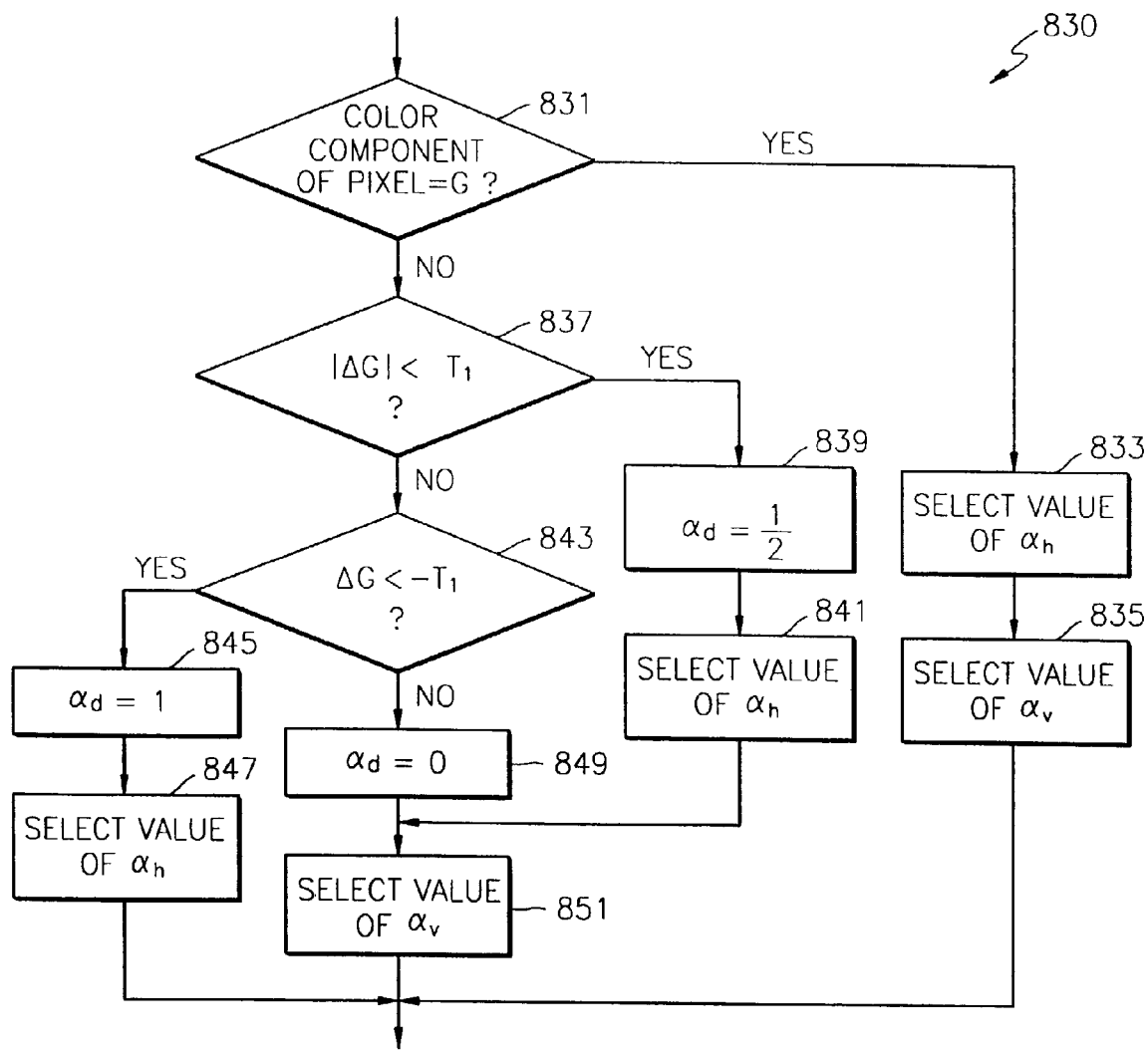
FIG. 9 is a detailed flowchart of a step for selecting directional coefficient values of FIG. 8.

FIG. 9 is a detailed flowchart of step 830 for selecting directional coefficient values, of FIG. 8. Referring to FIG. 9, step 830 for selecting three directional coefficient values includes the steps 831 through 851.

In step 831, it is determined whether an arbitrary pixel for which color components are to be obtained has the G component already.

In steps 833 and 835, if the arbitrary pixel has the G component already, the second directional coefficient value and the third directional coefficient value are selected one by one.

In step 837, if the color component of the arbitrary pixel is not the G component, it is determined whether the absolute value of the difference (|ΔG|) between the absolute value of the G component which increases or decreases in the horizontal direction from the arbitrary pixel (hereinafter referred to as the absolute value of the horizontal slope component of the G component), and the absolute value of the G component which increases or decreases in the vertical direction from the arbitrary pixel (hereinafter referred to as the absolute value of the vertical slope component of the G component) is less than the first threshold ($T_1$).

In steps 839 and 841, if the absolute value of the difference (|ΔG|) between the absolute value of the horizontal slope component of the G component and the absolute value of the vertical slope component of the G component is less than the first threshold ($T_1$), the value of the first directional coefficient ($\alpha_d$) is set to the first state value (½), and the value of the second directional coefficient ($\alpha_h$) is selected.

In step 843, it is determined whether the difference (ΔG) between the absolute value of the horizontal slope component of the G component and the absolute value of the vertical slope component of the G component is less than the negative value ($-T_1$) of the first threshold ($T_1$).

In steps 845 and 847, if the difference (ΔG) between the absolute value of the horizontal slope component of the G component and the absolute value of the vertical slope component of the G component is less than the negative value ($-T_1$) of the first threshold ($T_1$), the value of the first directional coefficient ($\alpha_d$) is set to the second state value (1), and the value of the second directional coefficient ($\alpha_h$) is selected.

In step 849, if the difference (ΔG) between the absolute value of the horizontal slope component of the G component and the absolute value of the vertical slope component of the G component is greater than the positive value of the first threshold ($T_1$), the value of the first directional coefficient ($\alpha_d$) is set to the third state value (0).

In step 851, if the value of the first directional coefficient ($\alpha_d$) is set to the first state value (½) or the third state value (0), then the value of the third directional coefficient ($\alpha_v$) is selected.

The difference (ΔG) between the absolute value of the horizontal slope component of the G component and the absolute value of the vertical slope component of the G component is $|G_{i(j+1)}-G_{i(j-1)}|-|G_{(i-1)j}-G_{(i+1)j}|$, where the G component of pixel (i,j) to be obtained is $G_{ij}$, and i and j are integers.

Figure 10:
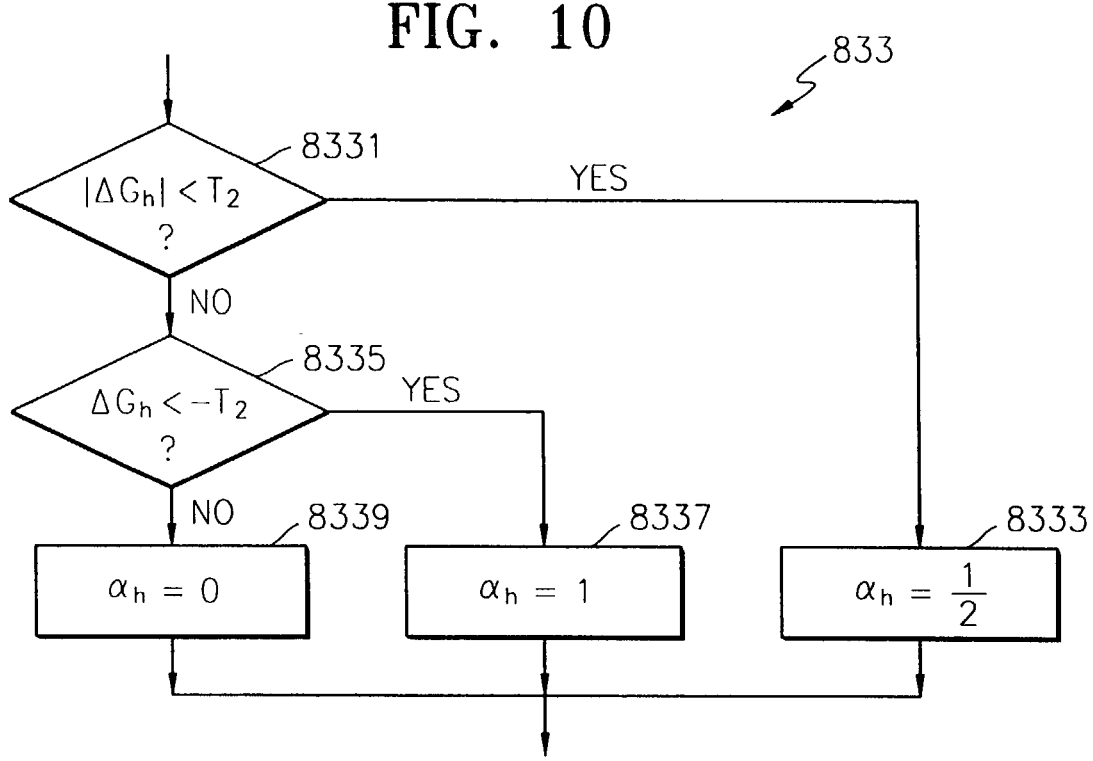
FIG. 10 is a flowchart of a step of FIG. 9 for selecting a second directional coefficient value when a pixel already has the G component.

FIG. 10 is a flowchart of step 833 of FIG. 9 for selecting the second directional coefficient value when the pixel already has the G component. Referring to FIG. 10, step 833 for selecting the second directional coefficient value includes the steps 8331 through 8339.

In step 8331, it is determined whether the absolute value of the difference ($|\Delta G_h|$) between the absolute value of the G component of pixels to the left of the arbitrary pixel which increases or decreases in the horizontal direction (hereinafter referred to as the absolute value of the left slope component of the G component), and the absolute value of the G component of pixels to the right of the arbitrary pixel which increases or decreases in the horizontal direction (hereinafter referred to as the absolute value of the right slope component of the G component) is less than the second threshold ($T_2$).

In step 8333, if the absolute value of the difference ($|\Delta G_h|$) between the absolute value of the left slope component of the G component and the absolute value of the right slope component of the G component is less than the second threshold ($T_2$), the value of the second directional coefficient ($\alpha_h$) is set to the first state value (½).

In step 8335, it is determined whether the difference ($\Delta G_h$) between the absolute value of the left slope component of the G component and the absolute value of the right slope component of the G component is less than the negative value ($-T_2$) of the second threshold ($T_2$).

In step 8337, if the difference ($\Delta G_h$) between the absolute value of the left slope component of the G component and the absolute value of the right slope component of the G component is less than the negative value ($-T_2$) of the second threshold ($T_2$), the value of the second directional coefficient ($\alpha_h$) is set to the second state value (1).

In step 8339, if the difference ($\Delta G_h$) between the absolute value of the left slope component of the G component and the absolute value of the right slope component of the G component is greater than the second threshold ($T_2$), the value of the second directional coefficient ($\alpha_h$) is set to the third state value (0).

The difference ($\Delta G_h$) between the absolute value of the left slope component of the G component and the absolute value of the right slope component of the G component is $|G_{ij}-G_{i(j-2)}|-|G_{ij}-G_{i(j+2)}|$, where the G component of pixel (i,j) to be obtained is $G_{ij}$, and i and j are integers.

Figure 11:
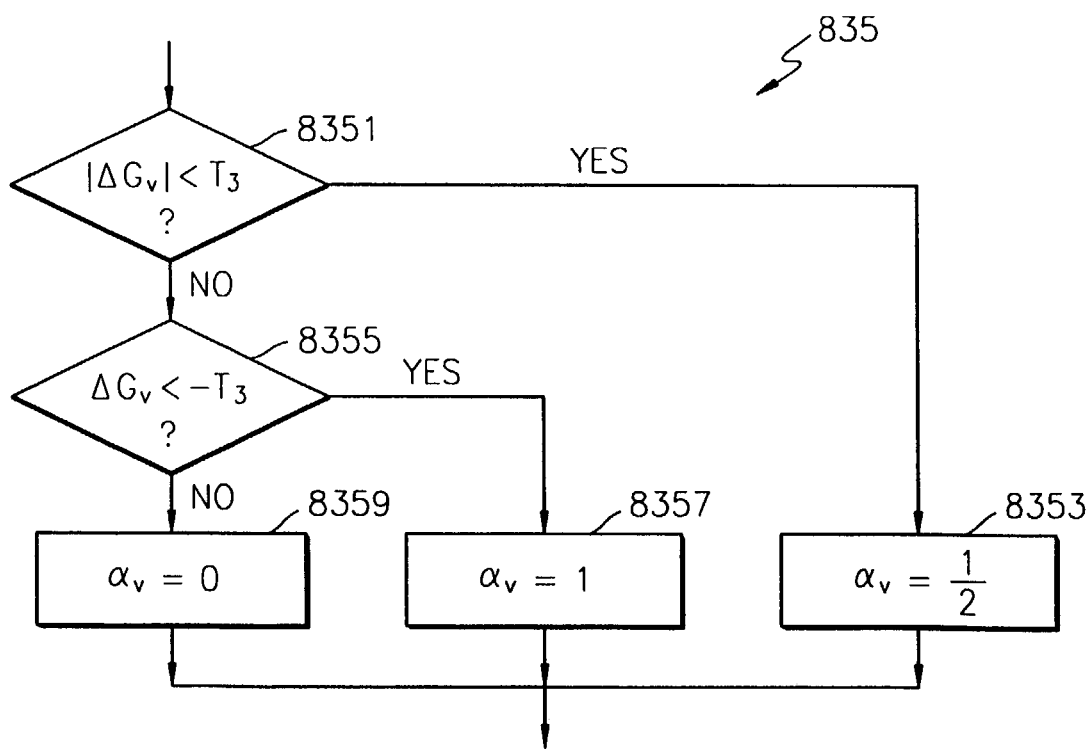
FIG. 11 is a flowchart of a step of FIG. 9 for selecting a third directional coefficient value when a pixel already has the G component.

FIG. 11 is a flowchart of step 835 of FIG. 9 for selecting the third directional coefficient value when the pixel already has the G component. Referring to FIG. 11, step 835 for selecting the third directional coefficient value includes steps 8351 through 8359.

In step 8351, it is determined whether the absolute value of the difference ($|\Delta G_v|$) between the absolute value of the G component of pixels above the arbitrary pixel which increases or decreases in the vertical direction (hereinafter referred to as the absolute value of the upper part slope component of the G component) and the absolute value of the G component of pixels below the arbitrary pixel which increases or decreases in the vertical direction (hereinafter referred to as the absolute value of the lower part slope component of the G component) is less than the third threshold ($T_3$).

In step 8353, if the absolute value of the difference ($|\Delta G_v|$) between the absolute value of the upper part slope component of the G component and the absolute value of the lower part slope component of the G component is less than the third threshold ($T_3$), the value of the third directional coefficient ($\alpha_v$) is set to the first state value (½)

In step 8355, it is determined whether the difference ($\Delta G_v$) between the absolute value of the upper part slope component of the G component and the absolute value of the lower part slope component of the G component is less than the negative value ($-T_3$) of the third threshold ($T_3$).

In step 8357, if the difference ($\Delta G_v$) between the absolute value of the upper part slope component of the G component and the absolute value of the lower part slope component of the G component is less than the negative value ($-T_3$) of the third threshold ($T_3$), the value of the third directional coefficient ($\alpha_v$) is set to the second state value (1).

In step 8359, if the difference ($\Delta G_v$) between the absolute value of the upper part slope component of the G component and the absolute value of the lower part slope component of the G component is greater than the third threshold ($T_3$), the value of the third directional coefficient ($\alpha_v$) is set to the third state value (0).

The difference ($\Delta G_v$) between the absolute value of the upper part slope component of the G component and the absolute value of the lower part slope component of the G component is $|G_{ij}-G_{(i-2)j}|-|G_{ij}-G_{(i+2)j}|$, where the G component of pixel (i,j) to be obtained is $G_{ij}$, and i and j are integers.

Figure 12:
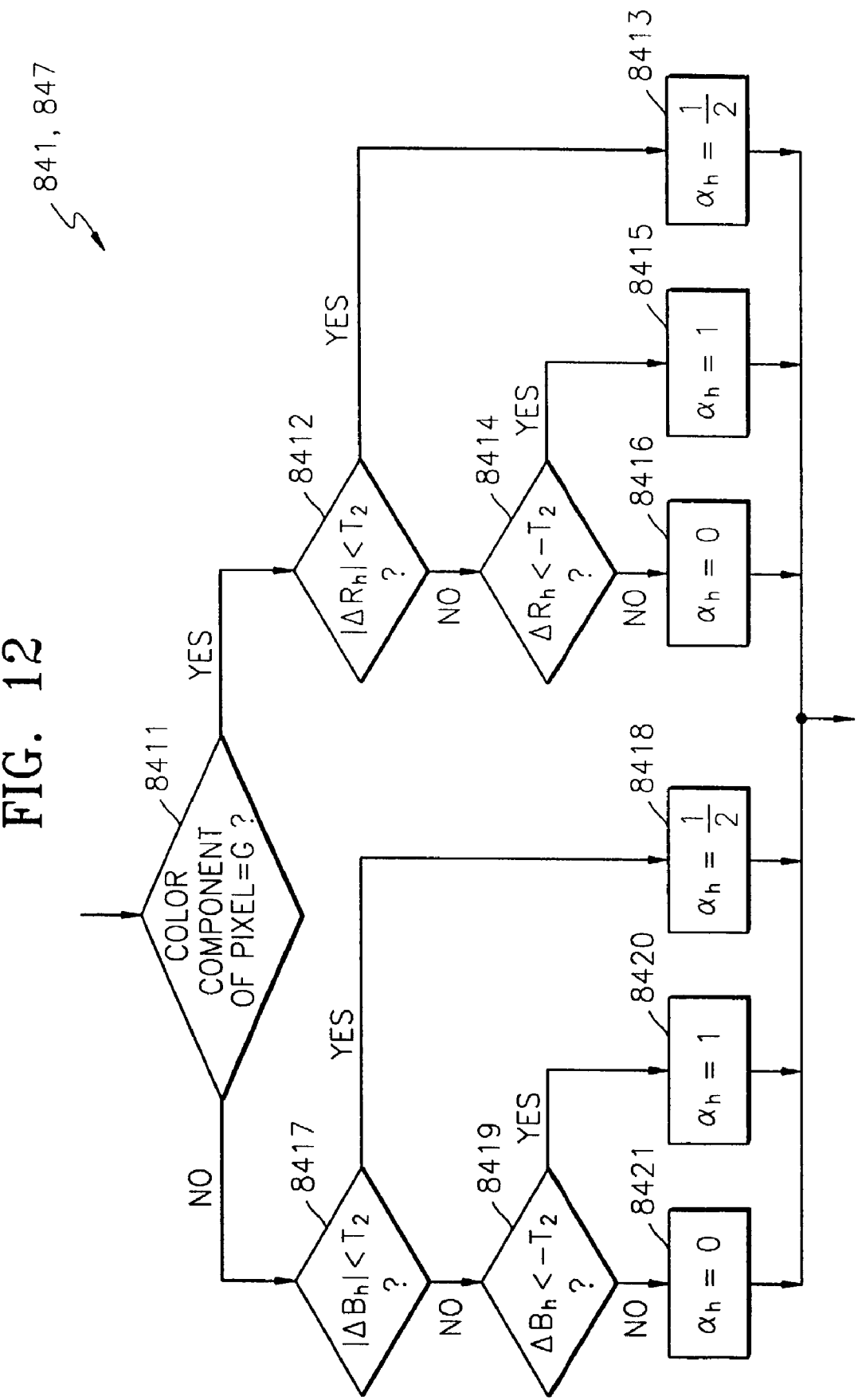
FIG. 12 is a flowchart of steps of FIG. 9 for selecting the second directional coefficient value when the pixel for which color components are to be obtained does not have the G component.

FIG. 12 is a flowchart of steps 841 and 847 of FIG. 9 for selecting the second directional coefficient value when the color component of the pixel for which color components are to be obtained is not the G component.

Referring to FIG. 12, steps 841 and 847 for selecting the second directional coefficient value include steps 8411 through 8421.

In step 8411, it is determined whether the color component the arbitrary pixel has is the R component.

In step 8412, when the arbitrary pixel has the R component, it is determined whether the absolute value of the difference ($|\Delta R_h|$) between the absolute value of the R component of pixels to the left of the arbitrary pixel which increases or decreases in the horizontal direction (hereinafter referred to as the absolute value of the left slope component of the R component), and the absolute value of the R component of pixels to the right of the arbitrary pixel which increases or decreases in the horizontal direction (hereinafter referred to as the absolute value of the right slope component of the R component) is less than the second threshold ($T_2$).

In step 8413, if the absolute value of the difference ($|\Delta R_h|$) between the absolute value of the left slope component of the R component and the absolute value of the right slope component of the R component is less than the second threshold ($T_2$), the value of the second directional coefficient ($\alpha_h$) is set to the first state value (½).

In step 8414, it is determined whether the difference ($\Delta R_h$) between the absolute value of the left slope component of the R component and the absolute value of the right slope component of the R component is less than the negative value ($-T_2$) of the second threshold ($T_2$).

In step 8415, if the difference ($\Delta R_h$) between the absolute value of the left slope component of the R component and the absolute value of the right slope component of the R component is less than the negative value ($-T_2$) of the second threshold ($T_2$), the value of the second directional coefficient ($\alpha_h$) is set to the second state value (1).

In step 8416, if the difference ($\Delta R_h$) between the absolute value of the left slope component of the R component and the absolute value of the right slope component of the R component is greater than the second threshold ($T_2$), the value of the second directional coefficient ($\alpha_h$) is set to the third state value (0).

In step 8417, when the arbitrary pixel does not have the R component, it is determined whether the absolute value of the difference ($\Delta B_h$) between the absolute value of the B component of pixels to the left of the arbitrary pixel which increases or decreases in the horizontal direction (hereinafter referred to as the absolute value of the left slope component of the B component), and the absolute value of the B component of pixels to the right of the arbitrary pixel which increases or decreases in the horizontal direction (hereinafter referred to as the absolute value of the right slope component of the B component) is less than the second threshold ($T_2$).

In step 8418, if the absolute value of the difference ($|\Delta B_h|$) between the absolute value of the left slope component of the B component and the absolute value of the right slope component of the B component is less than the second threshold ($T_2$), the value of the second directional coefficient ($\alpha_h$) is set to the first state value (½).

In step 8419, it is determined whether the difference ($\Delta B_h$) between the absolute value of the left slope component of the B component and the absolute value of the right slope component of the B component is less than the negative value ($-T_2$) of the second threshold ($T_2$).

In step 8420, if the difference ($\Delta B_h$) between the absolute value of the left slope component of the B component and the absolute value of the right slope component of the B component is less than the negative value ($-T_2$) of the second threshold ($T_2$), the value of the second directional coefficient ($\alpha_h$) is set to the second state value (1).

In step 8421, if the difference ($\Delta B_h$) between the absolute value of the left slope component of the B component and the absolute value of the right slope component of the B component is greater than the second threshold ($T_2$), the value of the second directional coefficient ($\alpha_h$) is set to the third state value (0).

The difference ($\Delta R_h$) between the absolute value of the left slope component of the R component and the absolute value of the right slope component of the R component is $|R_{ij}-R_{i(j-2)}|-|R_{ij}-R_{i(j+2)}|$, where the R component of pixel (i,j) to be obtained is $R_{ij}$, and i and j are integers.

The difference ($\Delta B_h$) between the absolute value of the left slope component of the B component and the absolute value of the right slope component of the B component is $|B_{ij}-B_{i(j-2)}|-|B_{ij}-B_{i(j+2)}|$, where the B component of pixel (i,j) to be obtained is $B_{ij}$, and i and j are integers.

Figure 13:
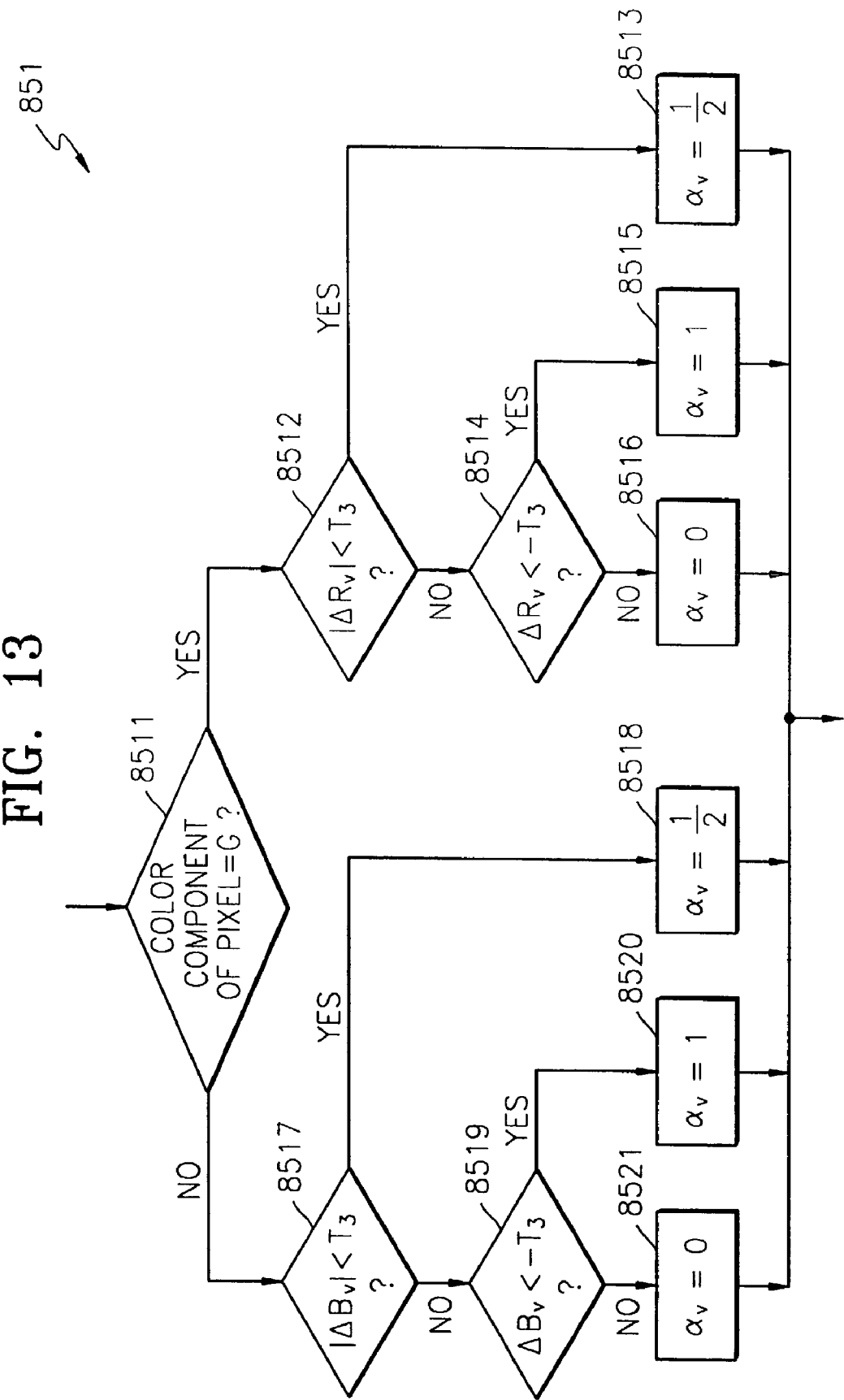
FIG. 13 is a flowchart of a step for selecting the third directional coefficient value when the pixel for which color components are to be obtained does not have the G component.

FIG. 13 is a flowchart of step 851 for selecting the third directional coefficient value when the color component the arbitrary pixel has is not the G component. Referring to FIG. 13, step 851 for selecting the third directional coefficient value includes steps 8511 through 8521.

In step 8511, it is determined whether the color component of the arbitrary pixel is the R component.

In step 8512, if the color component of the pixel is the R component, it is determined whether the absolute value of the difference ($|\Delta R_v|$) between the absolute value of the R component of pixels above the arbitrary pixel which increases or decreases in the vertical direction (hereinafter referred to as the absolute value of the upper part slope component of the R component) and the absolute value of the R component of pixels below the arbitrary pixel which increases or decreases in the vertical direction (hereinafter referred to as the absolute value of the lower part slope component of the R component) is less than the third threshold ($T_3$).

In step 8513, if the absolute value of the difference ($\Delta R_v$) between the absolute value of the upper part slope component of the R component and the absolute value of the lower part slope component of the R component is less than the third threshold ($T_3$), the value of the third directional coefficient ($\alpha_v$) is set to the first state value (½)

In step 8514, it is determined whether the difference ($\Delta R_v$) between the absolute value of the upper part slope component of the R component and the absolute value of the lower part slope component of the R component is less than the negative value ($-T_3$) of the third threshold ($T_3$).

In step 8515, if the difference ($\Delta R_v$) between the absolute value of the upper part slope component of the R component and the absolute value of the lower part slope component of the R component is less than the negative value ($-T_3$) of the third threshold ($T_3$), the value of the third directional coefficient ($\alpha_v$) is set to the second state value (1).

In step 8516, if the difference ($\Delta R_v$) between the absolute value of the upper part slope component of the R component and the absolute value of the lower part slope component of the R component is greater than the third threshold ($T_3$), the value of the third directional coefficient ($\alpha_v$) is set to the third state value (0).

In step 8517, if the color component of the arbitrary pixel is not the R component, it is determined whether the absolute value of the difference ($|\Delta B_v|$) between the absolute value of the B component of pixels above the arbitrary pixel which increases or decreases in the vertical direction (hereinafter referred to as the absolute value of the upper part slope component of the B component) and the absolute value of the B component of pixels below the arbitrary pixel which increases or decreases in the vertical direction (hereinafter referred to as the absolute value of the lower part slope component of the B component) is less than the third threshold ($T_3$).

In step 8518, if the absolute value of the difference ($|\Delta B_v|$) between the absolute value of the upper part slope component of the B component and the absolute value of the lower part slope component of the B component is less than the third threshold ($T_3$), the value of the third directional coefficient ($\alpha_v$) is set to the first state value (½)

In step 8519, it is determined whether the difference ($\Delta B_v$) between the absolute value of the upper part slope component of the B component and the absolute value of the lower part slope component of the B component is less than the negative value ($-T_3$) of the third threshold ($T_3$).

In step 8520, if the difference ($\Delta B_v$) between the absolute value of the upper part slope component of the B component and the absolute value of the lower part slope component of the B component is less than the negative value ($-T_3$) of the third threshold ($T_3$), the value of the third directional coefficient ($\alpha_v$) is set to the second state value (1).

In step 8521, if the difference ($\Delta B_v$) between the absolute value of the upper part slope component of the B component and the absolute value of the lower part slope component of the B component is greater than the third threshold ($T_3$), the value of the third directional coefficient ($\alpha_v$) is set to the third state value (0).

The difference ($\Delta R_v$) between the absolute value of the upper part slope component of the R component and the absolute value of the lower part slope component of the R component is $|R_{ij}-R_{(i-2)j}|-|R_{ij}-R_{(i+2)j}|$, where the R component of pixel (i,j) to be obtained is $R_{ij}$, and i and j are integers.

The difference ($\Delta B_v$) between the absolute value of the upper part slope component of the B component and the absolute value of the lower part slope component of the B component is $|B_{ij}-B_{(i-2)j}|-|B_{ij}-B_{(i+2)j}|$, where the B component of pixel (i,j) to be obtained is $B_{ij}$, and i and j are integers.

Preferably, the first threshold ($T_1$) through the third threshold ($T_3$) are integers greater than 4 and less than 20.

The interpolation steps include a step for calculating the output data of the image sensor, and with respect to selected directional coefficient values, selecting data items which correspond to the selected directional coefficient values among the calculated data, as the R component (not shown), a step for calculating the output of the image sensor, and with respect to selected directional coefficient values, selecting data items which correspond to the selected directional coefficient values among the calculated data, as the G component (not shown), and a step for calculating the output of the image sensor, and with respect to selected directional coefficient values, selecting data items which correspond to the selected direction coefficient values among the calculated data, as the B component (not shown).

In the method for processing the output data of the image sensor, at least one or more state values are further included, and the state values can be used to indicate the degree of slope of edges which have diagonal components having different slopes, edges which have horizontal components having different slopes, and edges which have vertical components having different slopes.

The mathematical basis for the apparatus and method for processing the output data of an image sensor according to the present invention will now be described.

The difference between the G value and R value of pixel (2,2) of FIG. 1 can be obtained by using the G values and R values of four pixels ((2,1), (2,3), (1,2), and (3,2)) adjacent to pixel (2,2). That is, the difference between the G value and R value of pixel (2,1) is multiplied by a predetermined weighted value ($\alpha$). Likewise, the differences of the G values and R values of the remaining pixels (2,3), (1,2), and (3,2) are multiplied by predetermined weighted values β., γ, and σ, respectively. Then, if the four calculation results are added (weighted sum), the result is the difference between the G value and R value of pixel (2,2). That is, the difference between the G value and R value of pixel (2,2) is obtained by the following equation 1:

$$G_{22}-R_{22}=\alpha(G_{21}-R_{21})+\beta(G_{23}-R_{23})+\gamma(G_{12}-R_{12})+\sigma(G_{32}-R_{32}) \quad (1)$$

Here, $\alpha+\beta+\gamma+\sigma=1$.

Equation 1 can be expressed as the following equation 2 with respect to the direction of the edge component of an image in pixel (2,2):

$$G_{22} - R_{22} = \alpha_d[\alpha_h(G_{21} - R_{21}) + (1 - \alpha_h)(G_{23} - R_{23})] + (1 - \alpha_d)[\alpha_v(G_{12} - R_{12}) + (1 - \alpha_v)(G_{32} - R_{32})] \quad 2)$$

Here, $\alpha_d$ indicates whether the horizontal direction edge component or the vertical direction edge component exists, $\alpha_h$ indicates the degree of the horizontal direction edge component, and $\alpha_h$ indicates the degree of the vertical direction edge component.

A method for obtaining directional coefficients ($\alpha_d$, $\alpha_h$, and $\alpha_v$) will now be described with an example of obtaining the G value of pixel (2,2).

First, $\alpha_d$ which indicates the degree of the horizontal direction edge or the vertical direction edge is determined by the following formula 3:

$$\text{if}(-T_1 < |G_{23} - G_{21}| - |G_{12} - G_{32}| < T_1), \text{ then } \alpha_d = \frac{1}{2} \quad (3)$$
$$\text{else if}(|G_{23} - G_{21}| - |G_{12} - G_{32}| < -T_1), \text{ then } \alpha_d = 1$$
$$\text{else } \alpha_d = 0$$

Referring to formula 3, if the absolute value of the difference between the absolute value ($|G_{23}-G_{21}|$) of the difference between the G components of pixels (2,3) and (2,1) adjacent to pixel (2,2) in the horizontal direction, and the absolute value ($|G_{12}-G_{32}|$) of the difference between the G components of pixels (1,2) and (3,2) adjacent to pixel (2,2) in the vertical direction, is less than the first threshold ($T_1$), $$\alpha_d = \frac{1}{2}.$$

If the absolute value of the difference between the absolute value ($|G_{23}-G_{21}|$) of the difference between the G components of pixels (2,3) and (2,1) adjacent to pixel (2,2) in the horizontal direction, and the absolute value ($|G_{12}-G_{32}|$) of the difference between the G components of pixels (1,2) and (3,2) adjacent to pixel (2,2) in the vertical direction, is less than the negative value ($-T_1$) of the first threshold ($T_1$), $\alpha_d=1$, and otherwise, $\alpha_d=0$.

$\alpha_h$ which indicates the degree of the horizontal direction edge component from the current pixel is determined by the following formula 4:

$$\text{if}(-T_2 < |R_{22} - R_{20}| - |R_{22} - R_{24}| < T_2), \text{ then } \alpha_h = \frac{1}{2} \quad (4)$$
$$\text{else if}(|R_{22} - R_{20}| - |R_{22} - R_{24}| < -T_2), \text{ then } \alpha_h = 1$$
$$\text{else } \alpha_h = 0$$

Referring to formula 4, if the absolute value of the difference between the absolute value ($|R_{22}-R_{20}|$) of the difference between the R components of pixel (2,2) and pixel (2,0) adjacent to pixel (2,2) in the horizontal direction, and the absolute value ($|R_{22}-R_{24}|$) of the difference between the R components of pixel (2,2) and pixel (2,4) adjacent to pixel (2,2) in the horizontal direction is less than the second threshold ($T_2$), $$\alpha_h = \frac{1}{2}.$$

If the absolute value of the difference between the absolute value ($|R_{22}-R_{20}|$) of the difference between the R components of pixel (2,2) and pixel (2,0) adjacent to pixel (2,2) in the horizontal direction, and the absolute value ($|R_{22}-R_{24}|$) of the difference between the R components of pixel (2,2) and pixel (2,4) adjacent to pixel (2,2) in the horizontal direction is less than the negative value ($-T_2$) of the second threshold ($T_2$), $\alpha_h=1$, and in the remaining case, $\alpha_h=0$.

$\alpha_v$ which indicates the degree of the vertical direction edge component is determined by the following formula 5:

$$\text{if } (-T_3 < |R_{22} - R_{02}| - |R_{22} - R_{42}| < T_3), \text{ then } a_v = \frac{1}{2} \quad (5)$$
$$\text{else if } (|R_{22} - R_{02}| - |R_{22} - R_{42}| < -T_3), \text{ then } a_v = 1$$
$$\text{else } a_v = 0$$

Referring to formula 5, if the absolute value of the difference between the absolute value ($|R_{22}-R_{02}|$) of the difference between the R components of pixel (2,2) and pixel (0,2) adjacent to pixel (2,2) in the vertical direction, and the absolute value ($|R_{22}-R_{42}|$) of the difference between the R components of pixel (2,2) and pixel (4,2) adjacent to pixel (2,2) in the vertical direction, is less than the third threshold ($T_3$), $$a_v = \frac{1}{2}.$$

If the absolute value of the difference between the absolute value ($|R_{22}-R_{02}|$) of the difference between the R components of pixel (2,2) and pixel (0,2) adjacent to pixel (2,2) in the vertical direction, and the absolute value ($|R_{22}-R_{42}|$) of the difference between the R components of pixel (2,2) and pixel (4,2) adjacent to pixel (2,2) in the vertical direction, is less than the negative value ($-T_3$) of the second threshold ($T_3$), $a_v=1$, and otherwise, $a_v=0$.

Here, $T_1$, $T_2$, and $T_3$ are integers greater than 4 and less than 20.

Assuming that the values of the coefficients are all $\frac{1}{2}(\alpha_d = \alpha_h = \alpha_v = \frac{1}{2})$ in order to simplify the explanation, the R values of pixels adjacent to pixel (2,2) can be expressed as the following equations 6:

$$R_{21} = \frac{R_{20} + R_{22}}{2}, R_{23} = \frac{R_{22} + R_{24}}{2}, R_{12} = \frac{R_{02} + R_{22}}{2}, \text{ and} \quad (6)$$
$$R_{32} = \frac{R_{22} + R_{42}}{2} \ldots$$

Using the assumption ($\alpha_d = \alpha_h = \alpha_v = \frac{1}{2}$), and the results of equation 6 and equation 2, the value of the G component of pixel (2,2) is obtained as the following equation 7:

$$G_{22} = \frac{G_{21} + G_{23} + G_{12} + G_{32}}{4} + \frac{4R_{22} - R_{20} - R_{24} - R_{02} - R_{42}}{8} \quad (7)$$

Though the example of obtaining the values of pixel (2,2) is described, the values of any arbitrary pixel can be obtained in the same method.

FIG. 14 illustrates 19 types of edges that can be processed by the method for processing the output data from an image sensor according to the present invention. FIG. 15 is a table classifying edges which can be processed by three directional coefficients ($\alpha_d$, $\alpha_h$, and $\alpha_v$) for determining the G value of an arbitrary pixel (2,2).

Referring to FIGS. 14 and 15, it is shown that the method for processing the output data of an image sensor according to the present invention can process all of the diagonal edge components (a, b, c, and d), the horizontal edge components (f, h, j, l, n, o, p, q, and r), and the vertical edge components (e, g, k, m, o, p, q, and s). In particular, four edge components (o, p, q, and r) can be applied to two methods for processing the horizontal component and the vertical component.

Since when the R value or the B value of a pixel having the G value is to be obtained, interpolation in only one direction is used, the calcalution is simplified. A method for obtaining the R value can be applied in the same way as a method for obtaining the B value. Therefore, only the R value will be obtained here. Also, $\alpha_d$, which is used in obtaining the G plane value, is not used here, and only $\alpha_h$, that is the horizontal direction edge component, is considered.

FIG. 16 is a table showing the R component of pixel (2,3) with respect to directional coefficient $\alpha_h$, and the classification of edge types which satisfy the R components.

Using an interpolation method, the B value of a pixel having the R value, or the R value of a pixel having the B value, can be obtained. However, since the R value and B value of an arbitrary pixel does not have much influence on picture quality, obtaining the values by approximation does not cause a problem.

For example, the B value of pixel (2,2) having the R value can be obtained by calculating the arithmetic mean of the B values of neighboring four pixels ((1,1), (1,3), (3,1), and (3,3)). In the same manner, the R value of an arbitrary pixel having the B value can be obtained.

As described above, according to the apparatus and method for processing the output data of an image sensor according to the present invention, high quality pictures can be obtained regardless of whether the difference between intensities of different colors sensed in an arbitrary pixel of the image sensor is regular or irregular. Also, all edges of an image, including horizontal edges, vertical edges, diagonal edges, corner edges, and thick or thin edges, can be adaptively processed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for processing the output data of an image sensor comprising:
   a line memory module for receiving and storing the output data of a single image sensor, having information on color signals sensed in each pixel;
   a delay module for receiving the output data of the image sensor and the output data of the line memory module, delaying the received output data for a predetermined time using a clock signal, and then outputting the received output data;
   a directional coefficient value selector for receiving the output data of the delay module, selecting values of a plurality of directional coefficients for defining the edge components of the Red (R), Green (G), and Blue (B) components of a pixel which is to be obtained, and outputting the selected values, wherein the plurality of directional coefficients include a first directional coefficient for indicating only which component the edge of the pixel has from among the horizontal component, the vertical component, and the diagonal component; a second directional coefficient for indicating only the degree of the horizontal edge component which has a predetermined width from the horizontal line, and includes the upper part component, the lower part component, and both the upper part and lower part components from the horizontal line; and a third directional coefficient for indicating only the degree of the vertical edge component which has a predetermined width from the vertical line, and includes the left part component, the right part component, and both the left and right part components from the vertical line; and an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector.

2. The apparatus of claim 1, wherein the line memory module comprises:
   a first line memory for storing the output data of the image sensor;
   a second line memory for storing the output data of the first line memory;
   a third line memory for storing the output data of the second line memory; and
   a fourth line memory for storing the output data of the third line memory.

3. The apparatus of claim 1, wherein the delay module includes a plurality of delay blocks, each of which has a plurality of serially connected shift registers and delays the output data of the image sensor.

4. The apparatus of claim 3, wherein the number of serially connected shift registers is four for each delay block.

5. The apparatus of claim 1, wherein the directional coefficient value selector comprises:
   a calculating unit formed of a plurality of color component calculating units, each for determining whether the edge component in the horizontal direction and/or vertical direction and/or diagonal direction exists in each of R, G, and B components of an arbitrary pixel for which color components are to be obtained, and calculating the degree of the existing edge component; and
   a comparison determiner for determining the values of the plurality of directional coefficients by comparing the output data of the calculating unit with a predetermined number of thresholds.

6. The apparatus of claim 5, wherein depending on which color component a pixel for which a color component is to be obtained has, the plurality of color component calculating units comprises:
   a first color component calculating unit for obtaining the edge component of the G component if the pixel has the R component or the B component, and performing no operation if the pixel has the G component,
   a second color component calculating unit for obtaining the horizontal edge component of the R component if the pixel has the R component, obtaining the horizontal edge component of the G component if the pixel has the G component, and obtaining the horizontal edge component of the B component if the pixel has the B component; and
   a third color component calculating unit for obtaining the vertical edge component of the R component if the pixel has the R component, obtaining the vertical edge component of the G component if the pixel has the G component, and the vertical edge component of the B component if the pixel has the B component.

7. The apparatus of claim 6, wherein the first color component calculating unit calculates the difference between the absolute value of the G component which increases or decreases in the horizontal direction from an arbitrary pixel for which color components are to be obtained (the absolute value of the horizontal slope component of the G component), and the absolute value of the G component which increases or decreases in the vertical direction from the pixel (the absolute value of the vertical slope component of the G component).

8. The apparatus of claim 6, wherein assuming that the G component of arbitrary pixel (i,j) (where i and j are integers) is $G_{ij}$, the first color component calculating unit comprises:
   a first function block for obtaining the absolute value of the difference (horizontal component) between $G_{(i+1)j}$ and $G_{(i-1)j}$;
   a second function block for obtaining the absolute value of the difference (vertical component) between $Gi(j+1)$ and $G_{i(j-1)}$; and
   a first subtracter for obtaining the difference between the output signal of the first function block and the output signal of the second function block.

9. The apparatus of claim 6, wherein the second color component calculating unit calculates the difference between the absolute value of a left slope component and the absolute value of a right slope component of the R component if the arbitrary pixel has the R component, calculates the difference between the absolute value of the left slope component and the absolute value of the right slope component of the G component if the arbitrary pixel has the G component, or calculates the difference between the absolute value of the left slope component and the absolute value of the right slope component of the B component if the arbitrary pixel has the B component, and the third color component calculating unit calculates the difference between the absolute value of an upper part slope of the R component and the absolute value of a lower part slope of the R component if the arbitrary pixel has the R component, calculates the difference between the absolute value of the upper part slope of the G component and the absolute value of the lower part slope of the G component if the arbitrary pixel has the G component, or calculates the difference between the absolute value of the upper part slope of the B component and the absolute value of the lower part slope of the B component if the arbitrary pixel has the B component.

10. The apparatus of claim 6, wherein assuming that the R component, the G component, and the B component of arbitrary pixel (i,j) (where i and j are integers) are $R_{ij}$, $G_{ij}$, and $B_{ij}$, respectively, the second color component calculating unit comprises:
   a third function block for obtaining the absolute value of the difference between $R_{ij}$ and $R_{i(j+2)}$, obtaining the absolute value of the difference between $G_{ij}$ and $G_{i(j+2)}$, or obtaining the absolute value of the difference between $B_{ij}$ and $B_{i(j+2)}$;
   a fourth function block for obtaining the absolute value of the difference between $Ri(j-2)$ and $R_{ij}$, obtaining the absolute value of the difference between $G_{i(j-2)}$ and $G_{ij}$, or obtaining the absolute value of the difference between $B_{i(j-2)}$ and $B_{ij}$; and
   a second subtracter for obtaining the difference between the output signal of the third function block and the output signal of the fourth function block, and
   the third color component calculating unit comprises:
   a fifth function block for obtaining the absolute value of the difference between $R_{ij}$ and $R_{(i+2)j}$, obtaining the absolute value of the difference between $G_{ij}$ and $G_{(i+2)j}$, or obtaining the absolute value of the difference between $B_{ij}$ and $B_{(i+2)j}$;

a sixth function block for obtaining the absolute value of the difference between $R_{(i-2)j}$ and $R_{ij}$, obtaining the absolute value of the difference between $G_{(i-2)j}$ and $G_{ij}$, or obtaining the absolute value of the difference between $B_{(1-2)j}$ and $B_{ij}$; and a third subtracter for obtaining the difference between the output signal of the fourth function block and the output signal of the sixth function block.

11. The apparatus of claim 5, wherein the comparison determiner selects an arbitrary directional coefficient as a first state value if the output of the color component calculating unit is greater than a negative value of a threshold and less than a positive value of the threshold, selects the arbitrary directional coefficient as a second state value if the output is less than the negative value of the threshold, and selects the arbitrary directional coefficient as a third state value if the output is greater than the positive value of the threshold.

12. The apparatus of claim 11, wherein the first through third thresholds are integers greater than 4 and less than 20.

13. The apparatus of claim 11, wherein the first state value is ½, the second state value is 1, and the third state value is 0.

14. The apparatus of claim 1, wherein the adaptive interpolator comprises:

a G component interpolator for outputting the G component by performing interpolation according to the output signals of the delay module and the directional coefficient value selector;

an R component interpolator for outputting the R component by performing interpolation according to the output signals of the delay module and the directional coefficient value selector; and a B component interpolator for outputting the B component by performing interpolation according to the output signals of the delay module and the directional coefficient value selector.

15. The apparatus of claim 14, wherein the G component interpolator comprises:

a low pass filter component calculator for receiving a plurality of G components from among the output signal of the delay module, performing calculation, selecting the result of calculation according to the output signal of the value of the directional coefficient, and outputting the selected result;

a high pass filter component calculator for receiving a plurality of R components or B components from among the output signal of the delay module, performing calculation, selecting the result of calculation according to the output signal of the value of the directional coefficient, and outputting the selected result; and an adder for performing an OR operation on the output signal of the low pass filter component calculator and the output signal of the high pass filter component calculator.

16. The apparatus of claim 15, wherein the low pass filter component calcualtor comprises:

a first logic block unit comprising a plurality of logic blocks for performing OR operations on $G_{(i-1)j}$ and $G_{(i+1)j}$, $G_{i(j+1)}$ and $G_{(i+1)j}$, $G_{i(j+1)}$ and $G_{(i-1)j}$, $G_{i(j-1)}$ and $_{(i+1)j}$, $G_{(i-1)j}$ and $G_{(i-1)j}$, and $G_{i(j-1)}$ and $G_{i(j+1)}$, respectively, of pixel (i,j) which is to be obtained, and dividing each OR result by 2;

a second logic block unit comprising a plurality of logic blocks, each for selectively performing an OR operation on two of the output signals of the first logic block units and dividing the OR result by 2; and a first selector for selecting one of $G_{(i-1)j}$, $G_{i(j-1)}$, and $G_{(i+1)j}$, the output signals of the first logic block units, and the output signals of the second logic block units, according to the output signal of the directional coefficient value selector, and outputting the selected one.

17. The apparatus of claim 15, wherein the high pass filter component calculator comprises:

a third logic block unit comprising a plurality of logic blocks for dividing the difference between $R_{ij}$ and $R_{(i+2)j}$ or the difference between $B_{ij}$ and $B_{(i+2)j}$ by 2, the difference between $R_{ij}$ and $R_{(i-1)j}$ or the difference between $B_{ij}$ and $B_{(i-2)j}$ by 2, the difference between $R_{ij}$ and $R_{i(j+2)}$ or the difference between $B_{ij}$ and $B_{i(j+2)}$ by 2, and the difference between $R_{ij}$ and $R_{i(j-2)}$ or the difference between $B_{ij}$ and $B_{i(j-2)}$ by 2;

a fourth logic block unit comprising a plurality of logic blocks for selectively performing OR operations on the output signals of the third logic block unit and dividing the OR results by 2;

a fifth logic block unit comprising a plurality of logic blocks for selectively performing OR operations on the output signals of the fourth logic block unit and dividing the OR results by 2; and a second selector for selecting one of the output signals of the third through the fifth logic block units, according to the output signal of the directional coefficient value selector.

18. The apparatus of claim 14, wherein the R component interpolator, if the R component is to be obtained for a pixel (i,j) of which the G component is known, selects one of $$R_{i(j+1)} + \frac{G_{ij} - G_{i(j+2)}}{2},$$

$$\frac{R_{i(j-1)} + R_{i(j+1)}}{2} + \frac{2G_{ij} - G_{i(j-2)} - G_{i(j+2)}}{4} \text{ and}$$

$$R_{i(j-1)} + \frac{G_{ij} - G_{i(j-2)}}{2}$$

in response to the second directional coefficient, and outputs the selected one, and if the R component is to be obtained for a pixel (i,j) of which the B component is known, obtains the arithmetic mean $$\left( \frac{R_{(i-1)(j-1)} + R_{(i-1)(j+1)} + R_{(i+1)(j-1)} + R_{(i+1)(j+1)}}{4} \right)$$

of four pixels in the diagonal direction from pixel (i,j) and outputs the result; and the B component interpolator, if the B component is to be obtained for a pixel (i,j) of which the G component is known, selects one of $$B_{i(j+1)} + \frac{G_{ij} - G_{i(j+2)}}{2}, \frac{B_{i(j-1)} + B_{i(j+1)}}{2} + \frac{2G_{ij} - G_{i(j-2)} - G_{i(j+2)}}{4}$$

$$\text{and } B_{i(j-1)} + \frac{G_{ij} - G_{i(j-2)}}{2}$$

in response to the third directional coefficient, and outputs the selected one, and if the B component is to be obtained for a pixel (i,j) of which the R component is known, obtains the arithmetic mean $$\left(\frac{B_{(i-1)(j-1)} + B_{(i-1)(j+1)} + B_{(i+1)(j-1)} + B_{(i+1)(j+1)}}{4}\right)$$

of four pixels in the diagonal direction from pixel (i,j) and outputs the result.

19. A method for processing the output data of an image sensor for converting an input scene into an electronic signal, the method comprising the steps of:

storing the output data of the image sensor;

selecting values of at least three directional coefficients for determining the intensity of color components of a pixel to be obtained by using the stored output data of the image sensor and the currently output data of the image sensor; and performing interpolation for obtaining the R and B components of a pixel having the G component, the G and B components of a pixel having the R component, and the G and R components of a pixel having the B component, by using the plurality of directional coefficients selected in the above step and the output data of the image sensor, wherein the directional coefficients include a first directional coefficient for indicating only which component the edge of the pixel has from among the horizontal component, the vertical component, and the diagonal component, a second directional coefficient for indicating only the degree of the horizontal edge component which has a predetermined width from the horizontal line, and includes the upper part component, the lower part component, and both the upper part and lower part components from the horizontal line, and a third directional coefficient for indicating only the degree of the vertical edge component which has a predetermined width from the vertical line, and includes the left part component, the right part component, and both the left and right part components from the vertical line.

20. The method of claim 19, wherein in the step for storing the output data of the image sensor, the output data of the image sensor is divided into a plurality of predetermined units, line memories, each for storing one unit, store at least 4 units of the divided data, and the predetermined unit is one line in the Bayer array structure.

21. The method of claim 19, wherein the step for selecting the values of the three directional coefficients comprises the steps of:

determining whether an arbitrary pixel for which color components are to be obtained already has the G component;

selecting the values of the second directional coefficient and the third directional coefficient one by one, if the arbitrary pixel has the G component already;

if the color component of the arbitrary pixel is not the G component, determining whether the absolute value of the difference between the absolute value of the G component which increases or decreases in the horizontal direction from the arbitrary pixel (hereinafter referred to as "the absolute value of the horizontal slope component of the G component"), and the absolute value of the G component which increases or decreases in the vertical direction from the arbitrary pixel (hereinafter referred to as "the absolute value of the vertical slope component of the G componen") is less than a first threshold;

if the absolute value of the difference between the absolute value of the horizontal slope component of the G component and the absolute value of the vertical slope component of the G component is less than the first threshold, setting the value of the first directional coefficient to a first state value, and selecting the value of the second directional coefficient;

determining whether the difference between the absolute value of the horizontal slope component of the G component and the absolute value of the vertical slope component of the G component is less than a negative value of the first threshold;

if the difference between the absolute value of the horizontal slope component of the G component and the absolute value of the vertical slope component of the G component is less than the negative value of the first threshold, setting the value of the first directional coefficient to a second state value, and selecting the value of the second directional coefficient;

if the difference between the absolute value of the horizontal slope component of the G component and the absolute value of the vertical slope component of the G component is greater than a positive value of the first threshold, setting the value of the first directional coefficient to a third state value; and if the value of the first directional coefficient is set to the first state value or the third state value, continuously selecting the value of the third directional coefficient.

22. The method of claim 21, wherein the difference between the absolute value of the horizontal slope component of the G component and the absolute value of the vertical slope component of the G component is $|G_{i(j+1)} - G_{i(j-1)}| - |G_{(i-1)j} - G_{(i+1)j}|$, where the G component of pixel (i,j) to be obtained is $G_{ij}$, and i and j are integers.

23. The method of claim 21, wherein the step for selecting the values of the second directional coefficient and the third directional coefficient one by one, when the pixel to be obtained already has the G component, comprises the steps of:

determining whether the absolute value of the difference between the absolute value of the G component of pixels to the left of the arbitrary pixel which increases or decreases in the horizontal direction (hereinafter referred to as "the absolute value of the left slope component of the G component", and the absolute value of the G component of pixels to the right of the arbitrary pixel which increases or decreases in the horizontal direction (hereinafter referred to as "the absolute value of the right slope component of the G component") is less than a second threshold;

if the absolute value of the difference between the absolute value of the left slope component of the G component and the absolute value of the right slope component of the G component is less than the second threshold, setting the value of the second directional coefficient to the first state value;

determining whether the difference between the absolute value of the left slope component of the G component and the absolute value of the right slope component of the G component is less than the negative value of the second threshold;

if the difference between the absolute value of the left slope component of the G component and the absolute value of the right slope component of the G component is less than the negative value of the second threshold, setting the value of the second directional coefficient to the second state value;

if the difference between the absolute value of the left slope component of the G component and the absolute value of the right slope component of the G component is greater than the second threshold, setting the value of the second directional coefficient to the third state value;

determining, based on the value of the second directional coefficient determined in the above step, whether the absolute value of the difference between the absolute value of the G component of pixels above the arbitrary pixel which increases or decreases in the vertical direction (hereinafter referred to as "the absolute value of the upper part slope component of the G component") and the absolute value of the G component of pixels below the arbitrary pixel which increases or decreases in the vertical direction (hereinafter referred to as "the absolute value of the lower part slope component of the G component") is less than a third threshold;

if the absolute value of the difference between the absolute value of the upper part slope component of the G component and the absolute value of the lower part slope component of the G component is less than the third threshold, setting the value of the third directional coefficient to the first state value;

determining whether the difference between the absolute value of the upper part slope component of the G component and the absolute value of the lower part slope component of the G component is less than the negative value of the third threshold;

if the difference between the absolute value of the upper part slope component of the G component and the absolute value of the lower part slope component of the G component is less than the negative value of the third threshold, setting the value of the third directional coefficient to the second state value; and if the difference between the absolute value of the upper part slope component of the G component and the absolute value of the lower part slope component of the G component is greater than the third threshold, setting the value of the third directional coefficient to the third state value.

24. The method of claim 23, wherein when the G component of pixel (i,j) to be obtained is $G_{ij}$, and i and j are integers, the difference between the absolute value of the left slope component of the G component and the absolute value of the right slope component of the G component is $|G_{ij}-G_{i(j-2)}|-|G_{ij}-G_{i(j+2)}|$ and the difference between the absolute value of the upper part slope component of the G component and the absolute value of the lower part slope component of the G component is $|G_{ij}-G_{(i-2)j}|-|G_{ij}-G_{(i+2)j}|$.

25. The method of claim 21, wherein the step for setting the value of the first directional coefficient to the second state value and selecting the value of the second directional coefficient comprises the steps of:

determining whether the color component the arbitrary pixel has is the R component;

when the arbitrary pixel has the R component, determining whether the absolute value of the difference between the absolute value of the R component of pixels to the left of the arbitrary pixel which increases or decreases in the horizontal direction (hereinafter referred to as "the absolute value of the left slope component of the R component"), and the absolute value of the R component of pixels to the right of the arbitrary pixel which increases or decreases in the horizontal direction (hereinafter referred to as "the absolute value of the right slope component of the R component") is less than the second threshold;

if the absolute value of the difference between the absolute value of the left slope component of the R component and the absolute value of the right slope component of the R component is less than the second threshold, setting the value of the second directional coefficient to the first state value;

determining whether the difference between the absolute value of the left slope component of the R component and the absolute value of the right slope component of the R component is less than the negative value of the second threshold;

if the difference between the absolute value of the left slope component of the R component and the absolute value of the right slope component of the R component is less than the negative value of the second threshold, setting the value of the second directional coefficient to the second state value;

if the difference between the absolute value of the left slope component of the R component and the absolute value of the right slope component of the R component is greater than the second threshold, setting the value of the second directional coefficient to the third state value;

when the arbitrary pixel does not have the R component, determining whether the absolute value of the difference between the absolute value of the B component of pixels to the left of the arbitrary pixel which increases or decreases in the horizontal direction (hereinafter referred to as "the absolute value of the left slope component of the B component"), and the absolute value of the B component of pixels to the right of the arbitrary pixel which increases or decreases in the horizontal direction (hereinafter referred to as "the absolute value of the right slope component of the B component") is less than the second threshold;

if the absolute value of the difference between the absolute value of the left slope component of the B component and the absolute value of the right slope component of the B component is less than the second threshold, setting the value of the second directional coefficient to the first state value;

determining whether the difference between the absolute value of the left slope component of the B component and the absolute value of the right slope component of the B component is less than the negative value of the second threshold;

if the difference between the absolute value of the left slope component of the B component and the absolute value of the right slope component of the B component is less than the negative value of the second threshold, setting the value of the second directional coefficient to the second state value; and if the difference between the absolute value of the left slope component of the B component and the absolute value of the right slope component of the B component is greater than the second threshold, setting the value of the second directional coefficient to the third state value.

26. The method of claim 25, wherein when the R component of pixel (i,j) to be obtained is $R_{ij}$ and i and j are integers, the difference between the absolute value of the left slope component of the R component and the absolute value of the right slope component of the R component is $|R_{ij}-R_{i(j-2)}|-|R_{ij}-R_{i(j+2)}|$, and when the B component of pixel (i,j) to be obtained is $B_{ij}$ and i and j are integers, the difference ($\Delta B_h$) of the absolute value of the left slope component of the B component and the absolute value of the right slope component of the B component is $|B_{ij}-B_{i(j-2)}|-|B_{ij}-B_{i(j+2)}|$.

27. The method of claim 21, wherein the step for continuously selecting the value of the third directional coefficient, if the value of the first directional coefficient is set to the first state value or the third state value, comprises the steps of:
   determining whether the color component of the arbitrary pixel is the R component;
   if the color component of the pixel is the R component, determining whether the absolute value of the difference between the absolute value of the R component of pixels above the arbitrary pixel which increases or decreases in the vertical direction (hereinafter referred to as "the absolute value of the upper part slope component of the R component") and the absolute value of the R component of pixels below the arbitrary pixel which increases or decreases in the vertical direction (hereinafter referred to as "the absolute value of the lower part slope component of the R component") is less than the third threshold;
   if the absolute value of the difference between the absolute value of the upper part slope component of the R component and the absolute value of the lower part slope component of the R component is less than the third threshold, setting the value of the third directional coefficient to the first state value;
   determining whether the difference between the absolute value of the upper part slope component of the R component and the absolute value of the lower part slope component of the R component is less than the negative value of the third threshold;
   if the difference between the absolute value of the upper part slope component of the R component and the absolute value of the lower part slope component of the R component is less than the negative value of the third threshold, setting the value of the third directional coefficient to the second state value;
   if the difference between the absolute value of the upper part slope component of the R component and the absolute value of the lower part slope component of the R component is greater than the third threshold, setting the value of the third directional coefficient to the third state value;
   if the color component of the arbitrary pixel is not the R component, determining whether the absolute value of the difference between the absolute value of the B component of pixels above the arbitrary pixel which increases or decreases in the vertical direction (hereinafter referred to as "the absolute value of the upper part slope component of the B component") and the absolute value of the B component of pixels below the arbitrary pixel which increases or decreases in the vertical direction (hereinafter referred to as "the absolute value of the lower part slope component of the B component") is less than the third threshold;
   if the absolute value of the difference between the absolute value of the upper part slope component of the B component and the absolute value of the lower part slope component of the B component is less than the third threshold, setting the value of the third directional coefficient to the first state value;
   determining whether the difference between the absolute value of the upper part slope component of the B component and the absolute value of the lower part slope component of the B component is less than the negative value of the third threshold;
   if the difference between the absolute value of the upper part slope component of the B component and the absolute value of the lower part slope component of the B component is less than the negative value of the third threshold, setting the value of the third directional coefficient to the second state value; and
   if the difference between the absolute value of the upper part slope component of the B component and the absolute value of the lower part slope component of the B component is greater than the third threshold, setting the value of the third directional coefficient to the third state value.

28. The method of claim 27, wherein the difference between the absolute value of the upper part slope component of the R component and the absolute value of the lower part slope component of the R component is $|R_{ij}-R_{(i-2)j}|-|R_{ij}-R_{(i+2)j}|$, where the R component of pixel (i,j) to be obtained is $R_{ij}$, and i and j are integers, and the difference between the absolute value of the upper part slope component of the B component and the absolute value of the lower part slope component of the B component is $|B_{ij}-B_{(i-2)j}|-|B_{ij}-B_{(i+2)j}|$, where the B component of pixel (i,j) to be obtained is $B_{ij}$, and i and j are integers.

29. The method of claim 21, wherein the first state value is ½, the second state value is 1, and the third state value is 0.

30. The method of any one of claims 21, 23, 25, and 27, wherein the first through the third threshold are integers greater than 4 and less than 20.

31. The method of claim 19, wherein the step for performing interpolation comprises the steps of: calculating the output data of the image sensor, and with respect to selected values of directional coefficients, selecting data items which correspond to the selected values of the directional coefficients from among the calculated data, as the R component;
   calculating the output of the image sensor, and with respect to selected values of the directional coefficients, selecting data items which correspond to the selected values of the directional coefficients from among the calculated data, as the G component; and
   calculating the output of the image sensor, and with respect to selected values of the directional coefficients, selecting data items which correspond to the selected values of the directional coefficients from among the calculated data, as the B component.

32. The method of claim 21, wherein one or more state values are further included, and the state values are used to indicate the degree of slope of edges which have diagonal components having different slopes, edges which have horizontal components having different slopes, and edges which have vertical components having different slopes.

33. An apparatus for processing the output data of an image sensor comprising:
   a line memory module for receiving and storing the output data of a single image sensor, having information on color signals sensed in each pixel;
   a delay module for receiving the output data of the image sensor and the output data of the line memory module, delaying the received output data for a predetermined time using a clock signal, and then outputting the received output data;

a directional coefficient value selector for receiving the output data of the delay module, selecting values of a plurality of directional coefficients for defining the edge components of the Red (R), Green (G), and Blue (B) components of a pixel which is to be obtained, and outputting the selected values, wherein the plurality of directional coefficients include a first directional coefficient for indicating only which component the edge of the pixel has from among the horizontal component, the vertical component, and the diagonal component; a second directional coefficient for indicating only the degree of the horizontal edge component which has a predetermined width from the horizontal line, and includes the upper part component, the lower part component, and both the upper part and lower part components from the horizontal line; and a third directional coefficient for indicating only the degree of the vertical edge component which has a predetermined width from the vertical line, and includes the left part component, the right part component, and both the left and right part components from the vertical line; and an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector, wherein the directional coefficient value selector comprises:

a calculating unit formed of a plurality of color component calculating units, each for determining whether the edge component in the horizontal direction and/or vertical direction and/or diagonal direction exists in each of R, G, and B components of an arbitrary pixel for which color components are to be obtained, and calculating the degree of the existing edge component; and a comparison determiner for determining the values of the plurality of directional coefficients by comparing the output data of the calculating unit with a predetermined number of thresholds.

34. An apparatus for processing the output data of an image sensor comprising:

a line memory module for receiving and storing the output data of a single image sensor, having information on color signals sensed in each pixel;

a delay module for receiving the output data of the image sensor and the output data of the line memory module, delaying the received output data for a predetermined time using a clock signal, and then outputting the received output data;

a directional coefficient value selector for receiving the output data of the delay module, selecting values of a plurality of directional coefficients for defining the edge components of the Red (R), Green (G), and Blue (B) components of a pixel which is to be obtained, and outputting the selected values; and an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector;

wherein the directional coefficient value selector comprises:

a calculating unit formed of a plurality of color component calculating units, each for determining whether the edge component in the horizontal direction and/or vertical direction and/or diagonal direction exists in each of R, G, and B components of an arbitrary pixel for which color components are to be obtained, and calculating the degree of the existing edge component; and a comparison determiner for determining the values of the plurality of directional coefficients by comparing the output data of the calculating unit with a predetermined number of thresholds;

wherein depending on which color component a pixel for which a color component is to be obtained has, the plurality of color component calculating units comprises:

a first color component calculating unit for obtaining the edge component of the G component if the pixel has the R component or the B component, and performing no operation if the pixel has the G component, a second color component calculating unit for obtaining the horizontal edge component of the R component if the pixel has the R component, obtaining the horizontal edge component of the G component if the pixel has the G component, and obtaining the horizontal edge component of the B component if the pixel has the B component; and a third color component calculating unit for obtaining the vertical edge component of the R component if the pixel has the R component, obtaining the vertical edge component of the G component if the pixel has the G component, and the vertical edge component of the B component if the pixel has the B component.

35. The apparatus of claim 34, wherein the first color component calculating unit calculates the difference between the absolute value of the G component which increases or decreases in the horizontal direction from an arbitrary pixel for which color components are to be obtained (the absolute value of the horizontal slope component of the G component), and the absolute value of the G component which increases or decreases in the vertical direction from the pixel (the absolute value of the vertical slope component of the G component).

36. The apparatus of claim 34, wherein assuming that the G component of arbitrary pixel (i,j) (where i and j are integers) is $G_{ij}$, the first color component calculating unit comprises:

a first function block for obtaining the absolute value of the difference (horizontal component) between $G_{(i+1)j}$ and $G_{(i-1)j}$;

a second function block for obtaining the absolute value of the difference (vertical component) between $G_{i(j+1)}$ and $G_{i(j-1)}$; and a first subtracter for obtaining the difference between the output signal of the first function block and the output signal of the second function block.

37. The apparatus of claim 34, wherein the second color component calculating unit calculates the difference between the absolute value of a left slope component and the absolute value of a right slope component of the R component if the arbitrary pixel has the R component, calculates the difference between the absolute value of the left slope component and the absolute value of the right slope component of the G component if the arbitrary pixel has the G component, or calculates the difference between the absolute value of the left slope component and the absolute value of the right slope component of the B component if the arbitrary pixel has the B component, and the third color component calculating unit calculates the difference between the absolute value of an upper part slope of the R component and the absolute value of a lower part slope of the R component if the arbitrary pixel has the R component, calculates the difference between the absolute value of the upper part slope of the G component and the absolute value of the lower part slope of the G component if the arbitrary pixel has the G component, or calculates the difference between the absolute value of the upper part slope of the B component and the absolute value of the lower part slope of the B component if the arbitrary pixel has the B component.

38. The apparatus of claim 34, wherein assuming that the R component, the G component, and the B component of arbitrary pixel (i,j) (where i and j are integers) are $R_{ij}$, $G_{ij}$, and $B_{ij}$, respectively, the second color component calculating unit comprises:
   a third function block for obtaining the absolute value of the difference between $R_{ij}$ and $R_{i(j+2)}$, obtaining the absolute value of the difference between $G_{ij}$ and $G_{i(j+2)}$, or obtaining the absolute value of the difference between $B_{ij}$ and $B_{i(j+2)}$;
   a fourth function block for obtaining the absolute value of the difference between Ri(j-2) and $R_{ij}$, obtaining the absolute value of the difference between $G_{i(j-2)}$ and $G_{ij}$, or obtaining the absolute value of the difference between $B_{i(j-2)}$ and $B_{ij}$; and
   a second subtracter for obtaining the difference between the output signal of the third function block and the output signal of the fourth function block, and the third color component calculating unit comprises:
   a fifth function block for obtaining the absolute value of the difference between $R_{ij}$ and $R_{(i+2)j}$, obtaining the absolute value of the difference between $G_{ij}$ and $G_{(i+2)j}$, or obtaining the absolute value of the difference between $B_{ij}$ and $B_{(i+2)j}$;
   a sixth function block for obtaining the absolute value of the difference between $R_{(i-2)j}$ and $R_{ij}$, obtaining the absolute value of the difference between $G_{(i-2)j}$ and $G_{ij}$, or obtaining the absolute value of the difference between $B_{(i-2)j}$ and $B_{ij}$; and
   a third subtracter for obtaining the difference between the output signal of the fourth function block and the output signal of the sixth function block.

39. An apparatus for processing the output data of an image sensor comprising:
   a line memory module for receiving and storing the output data of a single image sensor, having information on color signals sensed in each pixel;
   a delay module for receiving the output data of the image sensor and the output data of the line memory module, delaying the received output data for a predetermined time using a clock signal, and then outputting the received output data;
   a directional coefficient value selector for receiving the output data of the delay module, selecting values of a plurality of directional coefficients for defining the edge components of the Red (R), Green (G), and Blue (B) components of a pixel which is to be obtained, and outputting the selected values; and
   an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector;
wherein the directional coefficient value selector comprises:
   a calculating unit formed of a plurality of color component calculating units, each for determining whether the edge component in the horizontal direction and/or vertical direction and/or diagonal direction exists in each of R, G, and B components of an arbitrary pixel for which color components are to be obtained, and calculating the degree of the existing edge component; and
   a comparison determiner for determining the values of the plurality of directional coefficients by comparing the output data of the calculating unit with a predetermined number of thresholds;
   wherein the comparison determiner selects an arbitrary directional coefficient as a first state value if the output of the color component calculating unit is greater than a negative value of a threshold and less than a positive value of the threshold, selects the arbitrary directional coefficient as a second state value if the output is less than the negative value of the threshold, and selects the arbitrary directional coefficient as a third state value if the output is greater than the positive value of the threshold.

40. The apparatus of claim 39, wherein the first through third thresholds are integers greater than 4 and less than 20.

41. The apparatus of claim 39, wherein the first state value is ½, the second state value is 1, and the third state value is 0.

42. An apparatus for processing the output data of an image sensor comprising:
   a line memory module for receiving and storing the output data of a single image sensor, having information on color signals sensed in each pixel;
   a delay module for receiving the output data of the image sensor and the output data of the line memory module, delaying the received output data for a predetermined time using a clock signal, and then outputting the received output data;
   a directional coefficient value selector for receiving the output data of the delay module, selecting values of a plurality of directional coefficients for defining the edge components of the Red (R), Green (G), and Blue (B) components of a pixel which is to be obtained, and outputting the selected values; and
   an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector;
wherein the adaptive interpolator comprises:
   a G component interpolator for outputting the G component by performing interpolation according to the output signals of the delay module and the directional coefficient value selector;
   an R component interpolator for outputting the R component by performing interpolation according to the output signals of the delay module and the directional coefficient value selector; and a B component interpolator for outputting the B component by performing interpolation according to the output signals of the delay module and the directional coefficient value selector;

wherein the G component interpolator comprises:

a low pass filter component calculator for receiving a plurality of G components from among the output signal of the delay module, performing calculation, selecting the result of calculation according to the output signal of the values of the directional coefficient, and outputting the selected result;

a high pass filter component calculator for receiving a plurality of R components or B components from among the output signal of the delay module, performing calculation, selecting the result of calculation according to the output signal of the value of the directional coefficient, and outputting the selected result; and an adder for performing an OR operation on the output signal of the low pass filter component calculator and the output signal of the high pass filter component calculator.

43. The apparatus of claim 42, wherein the low pass filter component calcualtor comprises:

a first logic block unit comprising a plurality of logic blocks for performing OR operations on $G_{(i-1)j}$ and $G_{(i+1)j}$, $G_{i(j+1)}$ and $G_{i(+1)j}$, $G_{i(j+1)}$ and $G_{(i-1)j}$, $G_{i(j-1)}$ and $G_{(i+1)j}$, $G_{i(j-1)}$ and $G_{(i-1)j}$, and $G_{i(j-1)}$ and $G_{i(j+1)}$, respectively, of pixel (i,j) which is to be obtained, and dividing each OR result by 2;

a second logic block unit comprising a plurality of logic blocks, each for selectively performing an OR operation on two of the output signals of the first logic block units and dividing the OR result by 2; and a first selector for selecting one of $G_{(i-1)j}$, $G_{i(j-1)}$, $G_{i(j+1)}$, and $G_{(i+1)j}$, the output signals of the first logic block units, and the output signals of the second logic block units, according to the output signal of the directional coefficient value selector, and outputting the selected one.

44. The apparatus of claim 42, wherein the high pass filter component calculator comprises:

a third logic block unit comprising a plurality of logic blocks for dividing the difference the difference between $R_{ij}$ and $R_{(i+2)j}$ or the difference between $B_{ij}$ and $B_{(i+2)j}$ by 2, the difference between $R_{ij}$ and $R_{(i-1)j}$ or the difference between $B_{ij}$ and $B_{(i-2)j}$ by 2, the difference between $R_{ij}$ and $R_{i(j+2)}$ or the difference between $B_{ij}$ and $B_{i(j+2)}$ by 2, and the difference between $R_{ij}$ and $R_{i(j-2)}$ or the difference between $B_{ij}$ and $B_{i(j-2)}$ by 2;

a fourth logic block unit comprising a plurality of logic blocks for selectively performing OR operations on the output signals of the third logic block unit and dividing the OR results by 2;

a fifth logic block unit comprising a plurality of logic blocks for selectively performing OR operations on the output signals of the fourth logic block unit and dividing the OR results by 2; and a second selector for selecting one of the output signals of the third through the fifth logic block units, according to the output signal of the directional coefficient value selector.

45. An apparatus for processing the output data of an image sensor comprising:

a line memory module for receiving and storing the output data of a single image sensor, having information on color signals sensed in each pixel;

a delay module for receiving the output data of the image sensor and the output data of the line memory module, delaying the received output data for a predetermined time using a clock signal, and then outputting the received output data;

a directional coefficient value selector for receiving the output data of the delay module, selecting values of a plurality of directional coefficients for defining the edge components of the Red (R), Green (G), and Blue (B) components of a pixel which is to be obtained, and outputting the selected values; and an adaptive interpolator for receiving the output data of the delay module, and obtaining the R and B components of a pixel having the G component, the G and B components of a pixel having the R component, and the G and R components of a pixel having the B component, by performing interpolation using the received output data of the delay module in response to the output data of the directional coefficient value selector;

wherein the adaptive interpolator comprises:

a G component interpolator for outputting the G component by performing interpolation according to the output signals of the delay module and the directional coefficient value selector;

an R component interpolator for outputting the R component by performing interpolation according to the output signals of the delay module and the directional coefficient value selector; and a B component interpolator for outputting the B component by performing interpolation according to the output signals of the delay module and the directional coefficient value selector;

wherein the R component interpolator, if the R component is to be obtained for a pixel (i,j) of which the G component is known, selects one of $$R_{i(j+1)} + \frac{G_{ij} - G_{i(j+2)}}{2},$$

$$\frac{R_{i(j-1)} + R_{i(j+1)}}{2} + \frac{2G_{ij} - G_{i(j-2)} - G_{i(j+2)}}{4} \text{ and}$$

$$R_{i(j-1)} + \frac{G_{ij} - G_{i(j-2)}}{2}$$

in response to the second directional coefficient, and outputs the selected one, and if the R component is to be obtained for a pixel (i,j) of which the B component is known, obtains the arithmetic mean $$\left( \frac{R_{(i-1)(j-1)} + R_{(i-1)(j+1)} + R_{(i+1)(j-1)} + R_{(i+1)(j+1)}}{4} \right)$$

of four pixels in the diagonal direction from pixel (i,j) and outputs the result; and the B component interpolator, if the B component is to be obtained for a pixel (ij) of which the G component is known, selects one of $$B_{i(j+1)} + \frac{G_{ij} - G_{i(j+2)}}{2}, \frac{B_{i(j-1)} + B_{i(j+1)}}{2} + \frac{2G_{ij} - G_{i(j-2)} - G_{i(j+2)}}{4}$$

$$\text{and } B_{i(j-1)} + \frac{G_{ij} - G_{i(j-2)}}{2}$$

in response to the third directional coefficient, and outputs the selected one, and if the B component is to be obtained for a pixel (i,j) of which the R component is known, obtains the arithmetic mean $$\left(\frac{B_{(i-1)(j-1)} + B_{(i-1)(j+1)} + B_{(i+1)(j-1)} + B_{(i+1)(j+1)}}{4}\right)$$

of four pixels in the diagonal direction from pixel (i,j) and outputs the result.

46. A method for processing the output data of an image sensor for converting an input scene into an electronic signal, the method comprising the steps of:

storing the output data of the image sensor;

selecting values of at least three directional coefficients for determining the intensity of color components of a pixel to be obtained by using the stored output data of the image sensor and the currently output data of the image sensor; and performing interpolation for obtaining the R and B components of a pixel having the G component, the G and B components of a pixel having the R component, and the G and R components of a pixel having the B component, by using the plurality of directional coefficients selected in the above step and the output data of the image sensor, wherein the directional coefficients include a first directional coefficient for indicating which component the edge of the pixel has from among the horizontal component, the vertical component, and the diagonal component, a second directional coefficient for indicating the degree of the horizontal edge component which has a predetermined width from the horizontal line, and includes the upper part component, the lower part component, and both the upper part and lower part components from the horizontal line, and a third directional coefficient for indicating the degree of the vertical edge component which has a predetermined width from the vertical line, and includes the left part component, the right part component, and both the left and right part components from the vertical line;

wherein the step for selecting the values of the three directional coefficients comprises the steps of:

determining whether an arbitrary pixel for which color components are to be obtained already has the G component;

selecting the values of the second directional coefficient and the third directional coefficient one by one, if the arbitrary pixel has the G component already;

if the color component of the arbitrary pixel is not the G component, determining whether the absolute value of the difference between the absolute value of the G component which increases or decreases in the horizontal direction from the arbitrary pixel (hereinafter referred to as "the absolute value of the horizontal slope component of the G component"), and the absolute value of the G component which increases or decreases in the vertical direction from the arbitrary pixel (hereinafter referred to as "the absolute value of the vertical slope component of the G component") is less than a first threshold;

if the absolute value of the difference between the absolute value of the horizontal slope component of the G component and the absolute value of the vertical slope component of the G component is less than the first threshold, setting the value of the first directional coefficient to a first state value, and selecting the value of the second directional coefficient;

determining whether the difference between the absolute value of the horizontal slope component of the G component and the absolute value of the vertical slope component of the G component is less than a negative value of the first threshold;

if the difference between the absolute value of the horizontal slope component of the G component and the absolute value of the vertical slope component of the G component is less than the negative value of the first threshold, setting the value of the first directional coefficient to a second state value, and selecting the value of the second directional coefficient;

if the difference between the absolute value of the horizontal slope component of the G component and the absolute value of the vertical slope component of the G component is greater than a positive value of the first threshold, setting the value of the first directional coefficient to a third state value; and if the value of the first directional coefficient is set to the first state value or the third state value, continuously selecting the value of the third directional coefficient.

47. The method of claim 46, wherein the difference between the absolute value of the horizontal slope component of the G component and the absolute value of the vertical slope component of the G component is $|G_{i(j+1)}-G_{i(j-1)}|-|G_{(i-1)j}-G_{(i+1)j}|$, where the G component of pixel (i,j) to be obtained is $G_{ij}$, and i and j are integers.

48. The method of claim 46, wherein the step for selecting the values of the second directional coefficient and the third directional coefficient one by one, when the pixel to be obtained already has the G component, comprises the steps of:

determining whether the absolute value of the difference between the absolute value of the G component of pixels to the left of the arbitrary pixel which increases or decreases in the horizontal direction (hereinafter referred to as "the absolute value of the left slope component of the G component"), and the absolute value of the G component of pixels to the right of the arbitrary pixel which increases or decreases in the horizontal direction (hereinafter referred to as "the absolute value of the right slope component of the G component") is less than a second threshold;

if the absolute value of the difference between the absolute value of the left slope component of the G component and the absolute value of the right slope component of the G component is less than the second threshold, setting the value of the second directional coefficient to the first state value;

determining whether the difference between the absolute value of the left slope component of the G component and the absolute value of the right slope component of the G component is less than the negative value of the second threshold;

if the difference between the absolute value of the left slope component of the G component and the absolute value of the right slope component of the G component is less than the negative value of the second threshold, setting the value of the second directional coefficient to the second state value;

if the difference between the absolute value of the left slope component of the G component and the absolute value of the right slope component of the G component is greater than the second threshold, setting the value of the second directional coefficient to the third state value;

determining, based on the value of the second directional coefficient determined in the above step, whether the absolute value of the difference between the absolute value of the G component of pixels above the arbitrary pixel which increases or decreases in the vertical direction (hereinafter referred to as "the absolute value of the upper part slope component of the G component") and the absolute value of the G component of pixels below the arbitrary pixel which increases or decreases in the vertical direction (hereinafter referred to as "the absolute value of the lower part slope component of the G component") is less than a third threshold;

if the absolute value of the difference between the absolute value of the upper part slope component of the G component and the absolute value of the lower part slope component of the G component is less than the third threshold, setting the value of the third directional coefficient to the first state value;

determining whether the difference between the absolute value of the upper part slope component of the G component and the absolute value of the lower part slope component of the G component is less than negative value of the third threshold;

if the difference between the absolute value of the upper part slope component of the G component and the absolute value of the lower part slope component of the G component is less than the negative value of the third threshold, setting the value of the third directional coefficient to the second state value; and if the difference between the absolute value of the upper part slope component of the G component and the absolute value of the lower part slope component of the G component is greater than the third threshold, setting the value of the third directional coefficient to the third state value.

49. The method of claim 48, wherein when the G component of pixel (i,j) to be obtained is and $G_{ij}$, and j are integers, the difference between the absolute value of the left slope component of the G component and the absolute value of the right slope component of the G component is $|G_{ij}-G_{i(j-2)}|-|G_{ij}-G_{i(j+2)}|$ and the difference between the absolute value of the upper part slope component of the G component and the absolute value of the lower part slope component of the G component is $|G_{ij}-G_{(i-2)j}|-|G_{ij}-G_{(i+2)j}|$.

50. The method of claim 46, wherein the step for setting the value of the first directional coefficient to the second state value and selecting the value of the second directional coefficient comprises the steps of:

determining whether the color component the arbitrary pixel has is the R component;

when the arbitrary pixel has the R component, determining whether the absolute value of the difference between the absolute value of the R component of pixels to the left of the arbitrary pixel which increases or decreases in the horizontal direction (hereinafter referred to as "the absolute value of the left slope component of the R component"), and the absolute value of the R component of pixels to the right of the arbitrary pixel which increases or decreases in the horizontal direction (hereinafter referred to as "the absolute value of the right slope component of the R component") is less than the second threshold;

if the absolute value of the difference between the absolute value of the left slope component of the R component and the absolute value of the right slope component of the R component is less than the second threshold, setting the value of the second directional coefficient to the first state value;

determining whether the difference between the absolute value of the left slope component of the R component and the absolute value of the right slope component of the R component is less than the negative value of the second threshold;

if the difference between the absolute value of the left slope component of the R component and the absolute value of the right slope component of the R component is less than the negative value of the second threshold, setting the value of the second directional coefficient to the second state value;

if the difference between the absolute value of the left slope component of the R component and the absolute value of the right slope component of the R component is greater than the second threshold, setting the value of the second directional coefficient to the third state value;

when the arbitrary pixel does not have the R component, determining whether the absolute value of the difference between the absolute value of the B component of pixels to the left of the arbitrary pixel which increases or decreases in the horizontal direction (hereinafter referred to as "the absolute value of the left slope component of the B component"), and the absolute value of the B component of pixels to the right of the arbitrary pixel which increases or decreases in the horizontal direction (hereinafter referred to as "the absolute value of the right slope component of the B component") is less than the second threshold;

if the absolute value of the difference between the absolute value of the left slope component of the B component and the absolute value of the right slope component of the B component is less than the second threshold, setting the value of the second directional coefficient to the first state value;

determining whether the difference between the absolute value of the left slope component of the B component and the absolute value of the right slope component of the B component is less than the negative value of the second threshold;

if the difference between the absolute value of the left slope component of the B component and the absolute value of the right slope component of the B component is less than the negative value of the second threshold, setting the value of the second directional coefficient to the second state value; and if the difference between the absolute value of the left slope component of the B component and the absolute value of the right slope component of the B component is greater than the second threshold, setting the value of the second directional coefficient to the third state value.

51. The method of claim 50, wherein when the R component of pixel (i,j) to be obtained is $R_{ij}$ and i and j are integers, the difference between the absolute value of the left slope component of the R component and the absolute value of the right slope component of the R component is $|R_{ij}-R_{i(j-2)}|-|R_{ij}-R_{i(j+2)}|$, and when the B component of pixel (i,j) to be obtained is $B_{ij}$ and i and j are integers, the difference ($\Delta B_h$) of the absolute value of the left slope component of the B component and the absolute value of the right slope component of the B component is $|B_{ij}-B_{i(j-2)}|-|B_{ij}-B_{i(j+2)}|$.

52. The method of claim 46, wherein the step for continuously selecting the value of the third directional coefficient, if the value of the first directional coefficient is set to the first state value or the third state value, comprises the steps of:

determining whether the color component of the arbitrary pixel is the R component;

if the color component of the pixel is the R component, determining whether the absolute value of the difference between the absolute value of the R component of pixels above the arbitrary pixel which increases or decreases in the vertical direction (hereinafter referred to as "the absolute value of the upper part slope component of the R component") and the absolute value of the R component of pixels below the arbitrary pixel which increases or decreases in the vertical direction (hereinafter referred to as "the absolute value of the lower part slope component of the R component") is less than the third threshold;

if the absolute value of the difference between the absolute value of the upper part slope component of the R component and the absolute value of the lower part slope component of the R component is less than the third threshold, setting the value of the third directional coefficient to the first state value;

determining whether the difference between the absolute value of the upper part slope component of the R component and the absolute value of the lower part slope component of the R component is less than the negative value of the third threshold;

if the difference between the absolute value of the upper part slope component of the R component and the absolute value of the lower part slope component of the R component is less than the negative value of the third threshold, setting the value of the third directional coefficient to the second state value;

if the difference between the absolute value of the upper part slope component of the R component and the absolute value of the lower part slope component of the R component is greater than the third threshold, setting the value of the third directional coefficient to the third state value;

if the color component of the arbitrary pixel is not the R component, determining whether the absolute value of the difference between the absolute value of the B component of pixels above the arbitrary pixel which increases or decreases in the vertical direction (hereinafter referred to as "the absolute value of the upper part slope component of the B component") and the absolute value of the B component of pixels below the arbitrary pixel which increases or decreases in the vertical direction (hereinafter referred to as "the absolute value of the lower part slope component of the B component") is less than the third threshold;

if the absolute value of the difference between the absolute value of the upper part slope component of the B component and the absolute value of the lower part slope component of the B component is less than the third threshold, setting the value of the third directional coefficient to the first state value;

determining whether the difference between the absolute value of the upper part slope component of the B component and the absolute value of the lower part slope component of the B component is less than the negative value of the third threshold;

if the difference between the absolute value of the upper part slope component of the B component and the absolute value of the lower part slope component of the B component is less than the negative value of the third threshold, setting the value of the third directional coefficient to the second state value; and if the difference between the absolute value of the upper part slope component of the B component and the absolute value of the lower part slope component of the B component is greater than the third threshold, setting the value of the third directional coefficient to the third state value.

53. The method of claim 52, wherein the difference between the absolute value of the upper part slope component of the R component and the absolute value of the lower part slope component of the R component is $|R_{ij}-R_{(i-2)j}|-|R_{ij}-R_{(i+2)j}|$, where the R component of pixel (i,j) to be obtained is $R_{ij}$, and i and j are integers, and the difference between the absolute value of the upper part slope component of the B component and the absolute value of the lower part slope component of the B component is $|B_{ij}-B_{(i-2)j}|-|B_{ij}-B_{(i+2)j}|$, where the B component of pixel (i,j) to be obtained is $B_{ij}$, and i and j are integers.

54. The method of claim 46, wherein the first state value is ½, the second state value is 1, and the third state value is 0.

55. The method of any one of claims 46, 48, 50, and 52, wherein the first through the third threshold are integers greater than 4 and less than 20.

56. The method of claim 46, wherein one or more state values are further included, and the state values are used to indicate the degree of slope of edges which have diagonal components having different slopes, edges which have horizontal components having different slopes, and edges which have vertical components having different slopes.

* * * * *

UNITED STATES PATENT AND TRADEMARK OFFICE
CERTIFICATE OF CORRECTION

PATENT NO. : 7,142,239 B2
APPLICATION NO. : 10/222364
DATED : November 28, 2006
INVENTOR(S) : Soon-jae Cho It is certified that error appears in the above-identified patent and that said Letters Patent is hereby corrected as shown below:

Column 28, Line 14, delete "$G_{(i-1)}$" and insert --$G_{(i-1)j}$--.

Column 28, Line 16, delete "Gi(j + 1)" and insert --$G_{i(j+1)}$--.

Column 28, Line 55, delete "R i(j - 2)" and insert --$R_{i(j-2)}$--.

Column 29, Line 5, delete "$B_{(1-2)j}$" and insert --$B_{(i-2)j}$--.

Column 29, Line 62, delete "$G_{i(j+1)}$" and insert --$G_{i(j+1)}$--.

Column 29, Line 63, delete "$_{(i+1)j}$" and insert --$G_{(i+1)j}$--.

Column 30, Line 3, before "and" insert --$G_{i(j+1)}$,--.

Column 32, Line 2, delete "componen" and insert --component--.

Column 32, Line 36, delete "$G_{i(j-1)j}$" and insert --$G_{i(j-1)}$--.

Column 32, Line 48, delete "," after "component" and insert --)--.

Column 33, Line 50, delete "$G_{i(j+2)}$" and insert --$G_{i(j+2)}$--.

Column 39, Line 27, delete "Ri (j - 2)" and insert --$R_{i(j-2)}$--.

Column 39, Line 36, delete "$R_{(i+2)}$" and insert --$R_{(i+2)j}$--.

Column 39, Line 38, delete "$G_{(i+2)}$" and insert --$G_{(i+2)j}$--.

Column 41, Line 8, delete "signal" and insert --signals--.

Column 41, Line 10, delete "signal" and insert --signals--.

Column 41, Lines 10-11, delete "coefficient" and insert --coefficients--.

Column 41, Line 14, delete "signal" and insert --signals--.

Column 41, Line 16, delete "signal" and insert --signals--.

Column 41, Line 16, delete "value" and insert --values--.

UNITED STATES PATENT AND TRADEMARK OFFICE
CERTIFICATE OF CORRECTION

PATENT NO. : 7,142,239 B2
APPLICATION NO. : 10/222364
DATED : November 28, 2006
INVENTOR(S) : Soon-jae Cho It is certified that error appears in the above-identified patent and that said Letters Patent is hereby corrected as shown below:

Column 41, Line 17, delete "coefficient" and insert --coefficients--.

Column 41, Line 28, delete "$G_{(i+1)j}$" and insert --$G_{(i+1)j}$--.

Column 41, Line 35, delete "$G_{i(i+1)j}$" and insert --$G_{i(j+1)}$--.

Column 41, Line 44, delete the second occurrence of "the difference".

Column 42, Line 58, delete "(ij)" and insert --(i,j)--.

Column 45, Line 40, after "and" insert --i and--.

Column 45, Line 47, delete "$G_{(i-2)j}$" and insert --$G_{(i-2)j}$--.

Signed and Sealed this

Twelfth Day of August, 2008

JON W. DUDAS
*Director of the United States Patent and Trademark Office*